US009049160B2

(12) United States Patent
Granito et al.

(10) Patent No.: US 9,049,160 B2

(45) **Date of Patent: *Jun. 2, 2015**

(54) IDENTIFYING USERS SHARING COMMON CHARACTERISTICS

(75) Inventors: Jennifer Granito, Springfield, VA (US); Steve Greenberg, Frederick, MD (US); Andy Wick, McLean, VA (US); Tom Jarmolowski, Framingham, MA (US); Alan Keister, Oakton, VA (US); Jeremy Rephlo, Reston, VA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,207

(22) Filed: Sep. 13, 2012

(65) Prior Publication Data

US 2013/0066995 A1 Mar. 14, 2013

Related U.S. Application Data

(63) Continuation of application No. 12/815,847, filed on Jun. 15, 2010, which is a continuation of application No. 11/238,130, filed on Sep. 29, 2005, now Pat. No. 7,765,265.

(60) Provisional application No. 60/710,670, filed on Aug. 24, 2005, provisional application No. 60/679,652, filed on May 11, 2005.

(51) Int. Cl.

| | |
|---|---|
| ***G06F 15/16*** | (2006.01) |
| ***H04L 12/58*** | (2006.01) |
| ***G06Q 10/10*** | (2012.01) |

(52) U.S. Cl.

CPC ............ *H04L 51/043* (2013.01); *G06Q 10/107* (2013.01); *H04L 51/04* (2013.01); *Y10S 707/99933* (2013.01)

(58) Field of Classification Search

USPC .......................................................... 709/206

See application file for complete search history.

(56) References Cited

U.S. PATENT DOCUMENTS

| | | | |
|---|---|---|---|
| 4,837,798 | A | 6/1989 | Cohen et al. |
| 5,086,394 | A | 2/1992 | Shapira |

(Continued)

FOREIGN PATENT DOCUMENTS

| | | |
|---|---|---|
| EP | 0862304 | 9/1998 |
| EP | 1176840 | 1/2002 |

(Continued)

OTHER PUBLICATIONS

Espinoza et ak, "GeoNotes: Social and Navigational Aspects of Location-Based Information System", 2001, Ubicomp 2001, LNCS 2201, pp. 2-17.*

(Continued)

*Primary Examiner* — Hua Fan

(74) *Attorney, Agent, or Firm* — Keller Jolley Preece

(57) ABSTRACT

Displaying electronic information in an instant-messaging application includes accessing a first electronic message providing information describing a first user that has an identifier included in a set of identifiers of users of an instant messaging application. A second electronic message providing information describing a second user that has an identifier included in the set of identifiers of users of an instant messaging application is accessed. Content contained within the first and second messages is analyzed to determine that at least a portion of content is common to the first and second electronic messages. Based upon the content analysis, an indication that the first and second messages include common content is provided to the user. Alternatively or additionally, an indication that two users are in physical proximity to a geographic location may be provided in response to detecting that the two users are within a threshold distance from the geographic location.

39 Claims, 17 Drawing Sheets

700

Buddy Central 705a 710a 715a 705b 710b 705c 710c 705d 710d 715b

(56) References Cited

U.S. PATENT DOCUMENTS 5,276,905 A 1/1994 Hurst et al.
5,327,486 A 7/1994 Wolff et al.
5,533,110 A 7/1996 Pinard et al.
5,548,637 A 8/1996 Heller et al.
5,557,659 A 9/1996 Hyde-Thomson
5,608,786 A 3/1997 Gordon
5,694,616 A 12/1997 Johnson et al.
5,721,906 A 2/1998 Siefert
5,742,905 A 4/1998 Pepe et al.
5,774,670 A 6/1998 Montulli
5,793,365 A 8/1998 Tang et al.
5,796,395 A 8/1998 de Hond
5,802,470 A 9/1998 Gaulke et al.
5,850,594 A 12/1998 Cannon et al.
5,867,162 A 2/1999 O'Leary et al.
5,870,744 A 2/1999 Sprague
5,872,521 A 2/1999 Lopatukin et al.
5,878,219 A 3/1999 Vance, Jr. et al.
5,893,091 A 4/1999 Hunt et al.
5,893,099 A 4/1999 Schreiber et al.
5,920,692 A 7/1999 Nguyen et al.
5,940,488 A 8/1999 DeGrazia et al.
5,946,617 A 8/1999 Portaro et al.
5,948,058 A 9/1999 Kudoh et al.
5,951,643 A 9/1999 Shelton et al.
5,951,652 A 9/1999 Ingrassia, Jr. et al.
5,954,798 A 9/1999 Shelton et al.
5,960,173 A 9/1999 Tang et al.
5,963,951 A 10/1999 Collins
5,987,113 A 11/1999 James
5,991,791 A 11/1999 Siefert
5,995,023 A 11/1999 Kreft
6,002,402 A 12/1999 Schacher
6,009,413 A 12/1999 Webber et al.
6,012,051 A 1/2000 Sammon, Jr. et al.
6,014,135 A 1/2000 Fernandes
6,014,638 A 1/2000 Burge et al.
6,026,403 A 2/2000 Siefert
6,026,429 A 2/2000 Jones et al.
6,041,311 A 3/2000 Chislenko et al.
6,049,533 A 4/2000 Norman et al.
6,065,047 A 5/2000 Carpenter et al.
6,073,138 A 6/2000 de l'Etraz et al.
6,081,830 A 6/2000 Schindler
6,085,223 A 7/2000 Carino, Jr. et al.
6,088,435 A 7/2000 Barber et al.
6,134,432 A 10/2000 Holmes et al.
6,151,584 A 11/2000 Papierniak et al.
6,161,130 A 12/2000 Horvitz et al.
6,166,730 A 12/2000 Goode et al.
6,175,831 B1 1/2001 Weinreich et al.
6,199,103 B1 3/2001 Sakaguchi et al.
6,212,550 B1 4/2001 Segur
6,249,282 B1 6/2001 Sutcliffe et al.
6,249,740 B1 6/2001 Ito et al.
6,260,148 B1 7/2001 Aggarwal et al.
6,269,369 B1 7/2001 Robertson
6,301,609 B1 10/2001 Aravamudan et al.
6,311,211 B1 10/2001 Shaw et al.
6,314,450 B1 11/2001 Hachiya et al.
6,324,541 B1 11/2001 de l'Etraz et al.
6,330,590 B1 12/2001 Cotten
6,347,332 B1 2/2002 Malet et al.
6,351,698 B1 2/2002 Kubota et al.
6,363,392 B1 3/2002 Halstead et al.
6,374,246 B1 4/2002 Matsuo
6,374,290 B1 4/2002 Scharber et al.
6,389,127 B1 5/2002 Vardi et al.
6,389,372 B1 5/2002 Glance et al.
6,400,381 B1 6/2002 Barrett et al.
6,415,318 B1 7/2002 Aggarwal et al.
6,421,439 B1 7/2002 Liffick
6,421,709 B1 7/2002 McCormick et al.
6,425,012 B1 7/2002 Trovato et al.
6,430,604 B1 8/2002 Ogle et al.
6,434,599 B1 8/2002 Porter
6,446,112 B1 9/2002 Bunney et al.
6,449,344 B1 9/2002 Goldfinger et al.
6,449,634 B1 9/2002 Capiel
6,480,885 B1 11/2002 Olivier
6,484,196 B1 11/2002 Maurille
6,501,834 B1 12/2002 Milewski et al.
6,507,866 B1 1/2003 Barchi
6,525,747 B1 2/2003 Bezos
6,535,586 B1 3/2003 Cloutier et al.
6,539,421 B1 3/2003 Appelman et al.
6,545,660 B1 4/2003 Shen
6,549,937 B1 4/2003 Auerbach et al.
6,557,027 B1 4/2003 Cragun
6,559,863 B1 5/2003 Megiddo
6,571,234 B1 5/2003 Knight et al.
6,580,790 B1 6/2003 Henry et al.
6,606,647 B2 8/2003 Shah et al.
6,615,241 B1 9/2003 Miller et al.
6,636,733 B1 10/2003 Helferich
6,640,230 B1 10/2003 Alexander et al.
6,654,683 B2 11/2003 Jin et al.
6,665,173 B2 12/2003 Brandenberg et al.
6,677,968 B1 1/2004 Appelman
6,678,719 B1 1/2004 Stimmel
6,691,162 B1 2/2004 Wick
6,697,807 B2 2/2004 McGeachie
6,701,348 B2 3/2004 Sommerer
6,714,791 B2 * 3/2004 Friedman .................. 455/456.1
6,714,793 B1 3/2004 Carey et al.
6,731,308 B1 5/2004 Tang et al.
6,732,155 B2 5/2004 Meek
6,750,881 B1 6/2004 Appelman
6,772,188 B1 8/2004 Cloutier
6,781,608 B1 8/2004 Crawford
6,785,554 B1 8/2004 Amerga
6,785,681 B2 8/2004 Keskar et al.
6,788,769 B1 9/2004 Waites
6,799,039 B2 9/2004 Wu et al.
6,800,031 B2 10/2004 Di Cesare
6,834,195 B2 12/2004 Brandenberg et al.
6,839,737 B1 1/2005 Friskel
6,901,559 B1 5/2005 Blum et al.
6,904,026 B1 6/2005 Tarnanen et al.
6,907,243 B1 6/2005 Patel
6,912,563 B1 6/2005 Parker et al.
6,912,564 B1 6/2005 Appelman et al.
6,917,965 B2 7/2005 Gupta et al.
6,941,345 B1 9/2005 Kapil et al.
6,950,861 B1 9/2005 Amro et al.
6,968,179 B1 11/2005 De Vries
6,993,564 B2 1/2006 Whitten, II
7,031,724 B2 4/2006 Ross et al.
7,035,865 B2 4/2006 Doss et al.
7,058,036 B1 6/2006 Yu et al.
7,058,690 B2 6/2006 Maehiro
7,068,309 B2 6/2006 Toyama et al.
7,082,047 B2 7/2006 Chow
7,099,862 B2 8/2006 Fitzpatrick et al.
7,099,921 B1 8/2006 Engstrom et al.
7,124,123 B1 10/2006 Roskind et al.
7,127,232 B2 10/2006 O'Neil et al.
7,177,880 B2 2/2007 Ruvolo
7,185,059 B2 2/2007 Daniell et al.
7,190,956 B2 3/2007 Dorenbosch et al.
7,200,634 B2 4/2007 Mendiola et al.
7,202,814 B2 4/2007 Caspi et al.
7,219,303 B2 5/2007 Fish
7,222,156 B2 5/2007 Gupta et al.
7,257,570 B2 8/2007 Riise et al.
7,271,742 B2 9/2007 Sheha et al.
7,275,215 B2 9/2007 Werndorfer et al.
7,289,814 B2 * 10/2007 Amir et al. ................. 455/456.1
7,313,760 B2 12/2007 Grossman et al.
7,436,780 B2 10/2008 Stephens et al.
7,606,580 B2 10/2009 Granito et al.
7,765,265 B1 7/2010 Granito
7,890,123 B2 2/2011 Granito et al.
2001/0005861 A1 6/2001 Mousseau et al.

(56) References Cited

U.S. PATENT DOCUMENTS

2001/0013050 A1 8/2001 Shah
2001/0018663 A1 8/2001 Dussell et al.
2001/0044693 A1 11/2001 Gotou et al.
2002/0015061 A1 2/2002 Maguire
2002/0021307 A1 2/2002 Glenn et al.
2002/0023132 A1 2/2002 Tornabene et al.
2002/0023134 A1 2/2002 Roskowski et al.
2002/0028595 A1 3/2002 Higashi et al.
2002/0042816 A1 4/2002 Bae
2002/0059201 A1 5/2002 Work
2002/0065856 A1 5/2002 Kisiel
2002/0065894 A1 5/2002 Dalal et al.
2002/0077080 A1 6/2002 Greene
2002/0083136 A1 6/2002 Whitten, II
2002/0087620 A1 7/2002 Rouse et al.
2002/0091667 A1 7/2002 Jaipura et al.
2002/0095465 A1 7/2002 Banks et al.
2002/0103801 A1 8/2002 Lysons
2002/0112181 A1 8/2002 Smith
2002/0116463 A1 8/2002 Hart
2002/0116641 A1 8/2002 Mastrianni
2002/0133292 A1 9/2002 Miyaki
2002/0133369 A1 9/2002 Johnson
2002/0147777 A1 10/2002 Hackbarth et al.
2002/0174010 A1 11/2002 Rice, III
2002/0175953 A1 11/2002 Lin
2002/0178163 A1* 11/2002 Mayer ............................ 707/10
2002/0181703 A1 12/2002 Logan et al.
2002/0184089 A1 12/2002 Tsou et al.
2002/0192942 A1 12/2002 Dinesh
2002/0193942 A1 12/2002 Odakura et al.
2002/0199095 A1 12/2002 Bandini et al.
2003/0004743 A1 1/2003 Callegari
2003/0004855 A1 1/2003 Dutta et al.
2003/0004872 A1 1/2003 Gardi et al.
2003/0009523 A1 1/2003 Lindskog et al.
2003/0018726 A1 1/2003 Low et al.
2003/0023875 A1 1/2003 Hursey et al.
2003/0028524 A1 2/2003 Keskar et al.
2003/0028595 A1 2/2003 Vogt et al.
2003/0037112 A1 2/2003 Fitzpatrick
2003/0043201 A1 3/2003 Abdelhadi et al.
2003/0046198 A1 3/2003 Knapp et al.
2003/0050916 A1 3/2003 Ortega et al.
2003/0084103 A1 5/2003 Weiner et al.
2003/0093580 A1 5/2003 Thomas et al.
2003/0096621 A1 5/2003 Jana et al.
2003/0105822 A1 6/2003 Gusler et al.
2003/0126250 A1* 7/2003 Jhanji .......................... 709/223
2003/0131061 A1 7/2003 Newton et al.
2003/0140103 A1 7/2003 Szeto et al.
2003/0167324 A1 9/2003 Farnham et al.
2003/0182394 A1 9/2003 Ryngler et al.
2003/0187813 A1 10/2003 Goldman et al.
2004/0015548 A1 1/2004 Lee
2004/0036649 A1 2/2004 Taylor
2004/0054729 A1 3/2004 Fukuizumi et al.
2004/0056901 A1* 3/2004 March et al. .................. 345/811
2004/0111369 A1 6/2004 Lane et al.
2004/0117443 A1 6/2004 Barsness
2004/0122681 A1 6/2004 Ruvolo
2004/0122810 A1 6/2004 Mayer
2004/0122855 A1 6/2004 Ruvolo
2004/0128356 A1 7/2004 Bernstein et al.
2004/0179039 A1 9/2004 Blattner et al.
2004/0186738 A1 9/2004 Reisman
2004/0210844 A1 10/2004 Pettinati et al.
2004/0215648 A1 10/2004 Marshall
2004/0215721 A1 10/2004 Szeto et al.
2004/0243941 A1 12/2004 Fish
2004/0260762 A1 12/2004 Fish
2005/0015432 A1 1/2005 Cohen
2005/0021750 A1 1/2005 Abrams
2005/0027382 A1 2/2005 Kirmse et al.
2005/0038856 A1 2/2005 Krishnasamy et al.
2005/0043989 A1 2/2005 Shifrin
2005/0044152 A1 2/2005 Hardy et al.
2005/0048961 A1* 3/2005 Ribaudo et al. ............... 455/419
2005/0050143 A1 3/2005 Gusler et al.
2005/0060377 A1 3/2005 Lo et al.
2005/0076078 A1* 4/2005 Salton .......................... 709/201
2005/0076241 A1 4/2005 Appelman
2005/0080863 A1 4/2005 Daniell
2005/0086211 A1 4/2005 Mayer
2005/0091327 A1 4/2005 Koch
2005/0101335 A1 5/2005 Kelly et al.
2005/0102202 A1 5/2005 Linden et al.
2005/0113123 A1 5/2005 Torvinen
2005/0114229 A1 5/2005 Ackley et al.
2005/0153681 A1 7/2005 Hanson
2005/0166154 A1 7/2005 Wilson
2005/0197846 A1 9/2005 Pezaris
2006/0005133 A1 1/2006 Lyle et al.
2006/0046743 A1 3/2006 Mirho
2006/0052091 A1 3/2006 Onyon et al.
2006/0075044 A1 4/2006 Fox et al.
2006/0160548 A1 7/2006 Chen
2006/0167991 A1 7/2006 Heikes et al.
2006/0168054 A1 7/2006 Burkhart et al.
2006/0173824 A1 8/2006 Bensky et al.
2006/0173963 A1 8/2006 Roseway et al.
2006/0173985 A1 8/2006 Moore
2006/0182248 A1 8/2006 Smith et al.
2006/0212561 A1 9/2006 Feng
2006/0256816 A1 11/2006 Yarlagadda et al.
2006/0258368 A1 11/2006 Granito et al.
2006/0259474 A1 11/2006 Granito
2006/0277187 A1 12/2006 Roese et al.
2007/0032225 A1 2/2007 Konicek et al.
2007/0043828 A1 2/2007 Famolari et al.
2007/0053335 A1 3/2007 Onyon et al.
2007/0085739 A1 4/2007 Udall
2007/0116037 A1 5/2007 Moore
2007/0149214 A1 6/2007 Walsh et al.
2007/0156664 A1 7/2007 Norton et al.
2007/0210937 A1 9/2007 Smith et al.
2007/0243880 A1 10/2007 Gits et al.
2007/0288852 A1 12/2007 Fish
2008/0228887 A1* 9/2008 Robertson et al. ............ 709/206
2009/0089316 A1 4/2009 Kogan et al.
2010/0318622 A1 12/2010 Granito et al.
2011/0066947 A1 3/2011 Pei et al.
2011/0106898 A1 5/2011 Granito et al.
2013/0066993 A1 3/2013 Granito et al.
2013/0066994 A1 3/2013 Granito et al.
2013/0073642 A1 3/2013 Granito et al.
2013/0073643 A1 3/2013 Granito et al.
2013/0073644 A1 3/2013 Granito et al.
2013/0157694 A1 6/2013 Granito et al.
2013/0179524 A1 7/2013 Granito et al.
2013/0179525 A1 7/2013 Granito et al.
2013/0190019 A1 7/2013 Granito et al.

FOREIGN PATENT DOCUMENTS

GB 2357932 7/2001
GB 2368747 5/2002
JP 2000-284999 2/2000
JP 2000-499001 9/2000
JP 2000-259514 10/2000
JP 2001-084320 5/2001
WO WO 0198856 6/1905
WO WO 9710558 3/1997
WO WO 9746955 12/1997
WO WO 9816045 4/1998
WO WO 9847270 10/1998
WO WO 9908434 2/1999
WO WO 9934628 7/1999
WO WO 9948011 9/1999
WO WO 0079396 12/2000
WO WO 0106748 1/2001
WO WO 0124036 4/2001
WO WO 0122258 5/2001
WO WO 0143357 6/2001

(56) References Cited

FOREIGN PATENT DOCUMENTS

| | | |
|---|---|---|
| WO | WO 0167787 | 9/2001 |
| WO | WO 0180079 | 10/2001 |
| WO | WO 0203216 | 1/2002 |
| WO | WO 0235781 | 5/2002 |
| WO | WO 02062039 | 8/2002 |
| WO | WO 02073886 | 9/2002 |
| WO | WO 2004028178 | 4/2004 |
| WO | WO 2005086723 | 9/2005 |
| WO | WO 2007061669 | 5/2007 |

OTHER PUBLICATIONS

U.S. Appl. No. 12/815,847, filed Jun. 15, 2010, Granito.
U.S. Appl. No. 13/615,182, filed Sep. 13, 2012, Granito.
U.S. Appl. No. 13/615,198, filed Sep. 13, 2012, Granito.
U.S. Appl. No. 12/986,121, filed Jan. 6, 2011, Granito.
U.S. Appl. No. 13/615,263, filed Sep. 13, 2012, Granito.
U.S. Appl. No. 13/615,254, filed Sep. 13, 2012, Granito.
U.S. Appl. No. 13/615,246, filed Sep. 13, 2012, Granito.
Office Action, U.S. Appl. No. 11/238,129, Nov. 14, 2007, 35 pages.
International Search Report, Application Serial No. PCT/US2006/018286, dated Oct. 19, 2006, 12 pages.
Carlos Jensen et al., "Finding Others Online: Reputation Systems for Social Online Spaces", Apr. 2002, Paper: Group Spaces, pp. 447-454.
Takashi Yoshino et al., "Namba: Location-Aware Collaboration System for Shopping and Meeting", Aug. 2002, IEEE Transactins on Consumer Electronics, pp. 470-477.
Anand Ranganathan et al., "ConChat: A Context-Aware Chat Program", 2002, Pervasive Computing, pp. 51-57.
BuddyGopher-About, available on Jul. 13, 2004, reprinted from http://web.archive.org/web/20040713002836/www.buddygopher.com/about.html on Sep. 28, 2005 (4 pgs).
BuddyGopher-We Love Away Messages!, "BuddyGopher simultaneously checks the away messages of your favorite AIM® buddies.", available on Sep. 24, 2004, reprinted from http://web.archive.org/web/20040924104001/http://www.buddygopher. com/ on Sep. 28, 2005 (2 pgs).
Dodgeball.com:: mobile social software, "Hook up with friends, Discover what's around you.", available on Nov. 30, 2003, reprinted from http://web.archive.org/web/20041130034344/www.dodgeball.com/social/index.php on Sep. 28, 2005 (2 pgs).
Dodgeball.com:: mobile social software, "help: the basics", available on Oct. 9, 2004, reprinted from http://web.archive.org/web/20041009200739/www.dodgeball.com/social/help basics.php on Sep. 28, 2005 (2 pgs).
Dodgeball.com:: mobile social software, "help: text messaging", available on Oct. 13, 2004, reprinted from http://web.archive.org/web/20041013034241/www.dodgeball.com/social/helptext.php on Sep. 28, 2005 (3 pgs).
Dodgeball.com:: mobile social software, "help: use it", available on Oct. 9, 2004, reprinted from http://web.archive.org/web/20041009201853/www.dodgeball.com/social/help useitsphp on Sep. 28, 2005 (2pgs).
Office Action, U.S. Appl. No. 11/238,129, dated May 28, 2008, 70 pages.
"About Internet directory services," Outlook 2000 SR-1 (9.0.0.4527) Help File, on or before Aug. 10, 2001, p. 1.
"Active Directory Features," [online], Jun. 15, 1999 [ retrieved on May 13, 2003]. Retrieved from the Internet <http://www.microsoftcom/windows2000/server/evaluation/features/adlist.asp>, pp. 1-4.
"Active Directory Service Overview," [online], Nov. 30, 2001 [retrieved on May 13, 2003]. Retrieved from the Internet <http://www.microsoft.com/windows2000/server/evaluation/business/ad-datasheet.asp>, pp. 1-5.
"Active Directory," [online], [retrieved on May 13, 2003]. Retrieved from the Internet <http://www.microsoft.com/windows2000/technologies/directory/AD/defaultasp>, pp. 1-13.
"Benefits of Active Directory in a Windows 2000 Environment," [online], Sep. 20, 2001 [retrieved on May 13, 2003]. Retrieved from the Internet <http://www.microsoft.com/windows2000/server/evaluation/business/adwin2k.asp>, pp. 1-9.
"Directory Integration Can Lower Total Cost of Ownership and Increase Application Functionality," [online], Jul. 27, 1998 [retrieved on May 13, 2003]. Retrieved from the Internet < http://www.microsoft.com/presspass/press/1998/Ju198/ActivDPR.asp>, pp. 1 of 4.
"Enterprise Identity Management with Windows 2000 and Active Directory," [online], 1999 [retrieved on May 13, 2003]. Retrieved from the Internet < http://www.microsoft.com/technet/prodtechnol/ad/windows2000/evaluate/w2keims.asp?fra . . >, pp. 1-16.
"Integrating Applications with Windows 2000 and Active Directory," [online], Oct. 2000 [retrieved on May 8, 2003]. Retrieved from the Internet < http://www.microsoft.com/technet/prodtechnol/ad/windows2000/evaluate/adappstrasp?fra . . >, pp. 1-12.
"Integrating Microsoft Metadirectory Services and Active Direc¬ tory," [online], Aug. 31, 2000 [retrieved on May 13, 2003]. Retrieved from the Internet <http://www.microsoft.com/windows2000/server/ evaluation/news/bulletins/mmsma.asp>, p. 1.
"Look up contact information from an item," Outlook 2000 SR-1 (9.0.0. 4527) Help File, on or before Aug. 10, 2001, p. 1.
"Part I: Active Directory Operations," Active Directory Operations Guide, Microsoft Corporation, Microsoft Windows 2000, Version 1.5, pp. 1-187.
"Part II: Tasks and Procedures Appendices," Active Directory Operations Guide, Microsoft Corporation, Microsoft Windows 2000, Ver¬ sion 1.5, pp. 1-131.
"Set up LDAP directory services," Outlook 2000 SR-1 (9.0.0. 4527) Help File, on or before Aug. 10, 2001, p. 1.
"What new about exchanging information over the Internet," Outlook 2000 SR-1 (9.0.0. 4527) Help File, on or before Aug. 10, 2001, p. 1.
"Windows 2000 Directory Services," [online], [retrieved on May 13, 2003]. Retrieved from the Internet <http://www.microsoft.com/windows2000/technologies/directory/default. asp>, pp. 1-2.
"A Countermeasure to Duplicate-detecting Anti-spam Techniques," Robert J. Hall, AT&T Labs Technical Report 99.9.1, 1999, Abst. and pp. 1-26.
"A Reputation System for Peer-to-Peer Networks," Gupta et al., Jun. 1-3, 2003, NOSSDAV' 03, Monterey, California, pp. 144-152.
"Announce: Implementation of E-mail Spam Proposal," Maurice L. Marvin, news.admin.net-abuse.misc, Aug. 3, 1996, 2 pages.
"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
"AOL technology: Turning complicated things into a engaging services", 1996 Annual Report, 22 pages.
"BestCalls.com Announces the BestCalls Technology Index," Busi¬ ness Wire, Jun. 30, 1999, Business Wire, p. 1.
"Better Bayesian Filtering," Paul Graham Jan. 2003, pp. 1-11, http://www.paulgraham.com/betterhtml.
"Business at Cyberspeed: Brainstorm Becomes Quick Internet Hit," Walker, Jan. 24, 1999, The Washington Post, p. A.01 (4 total pages).
"CrushParty.com: Help," retrieved Jun. 12, 2002 from the World Wide Web: http://www.crushparty.com/help.jsp, 3 pages.
"Degrees of Separation Email Spam Protection," Halfbakery: Degrees of Separation Email Spam Protection, reprinted from http://halfbakery.com/idea/Degrees 20of 20Separation 20Email 20Spam 20Protecti . . printed on Mar. 1, 2004 (3 pages).
"Digital Artifacts for Remembering and Storytelling: Post History and Social Network Fragments," Viegas et al., retrieved from the World Wide Web: http://we.media.mit.edu/-fviegas/papers/posthistory snf.pdf, 10 total pages.
"Finding Others Online: Reputation Systems for Social Online Spaces," Jensen et al., Apr. 20-25, CHI, Minneapolis, Minnesota, vol. 4, Issue 1, pp. 447-454.
"Hottie or Nottie? Web Site Voters Let You Know Whether You Sizzle or Fizzle," Marino, Jul. 11, 2001, Florida Times Union, p. C.1. (2 total pages).
"Icq.anywhere, Email Features-Email Center-ICQ.com," retrieved Apr. 29, 2004 from the World Wide Web: http://www.icq. com/email/popular-features.html, pp. 1-5.

(56) References Cited

OTHER PUBLICATIONS

"Idea for Online Networking Brings Two Entrepreneurs Together," Patents: Idea for Online Networking Brings Two Entrepreneurs Together, reprinted from http://www.nytimes.com/2003/12/01/technology/0 1patt.html?acbcnn1+0&adxnnlx=107029 . . . , printed on Nov. 5, 2004 (3 pages).
"Instant Messaging for Gamers," PC Gamer, May 2004, vol. 11, No. 5, p. 28.
"Learning Spam: Simple Techniques for Freely-Available Software," Bart Massey et al, Computer Science Dept., Portland, or USA, 2003, pp. 1-14.
"Learning to Filter Spam E-Mail: A Comparison of a Naïve Bayesian and a Memory-Based Approach," Ion Adroutsopoulos et al., Univer¬ sity of Athens, Sep. 2000, pp. 1-12.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"Plaxo," Plaxo, reprinted from http://web.archive.org/web/20041105072256/http:www.plaxo.com/ printed on Nov. 5, 2004 (available on Feb. 14, 2004) (2 pages).
"Plaxo-Update Your Address Book," Plaxo Contact Networks, reprinted from http://web.archive.org/web/20030218233638/http://www.plaxo scorn/ printed on Nov. 5, 2004 (available on Feb. 18, 2003) (1 page.).
"Reflections on Friendster, Trust and Intimacy," Danah Boyd. Ubicomp 2003, Workshop Application for the Intimate Ubiquitous Computing Workshop. Seattle, WA, Oct. 12-15, 2003.
"Reputation Systems," Resnick et al., Dec. 2000, Communications of the ACM, vol. 43, No. 12, pp. 45-48.
"Rim Road: Software: Internet & Network: Webmessenger RIM J2ME/Instant Messaging," retrieved Apr. 29, 2004 from the World Wide Web: http://www.rimrod.com/software/riml/Webmessenger¬ RIM-J2ME-Instant -Messaging-20 . . . , pp. 1-4.
"Six Degrees-New Programs Help Companies 'Mine Workers' Relationships for Key Business Prospects," William M. Bulkeley et al., Marketplace, The Wall Street Journal, Aug. 4, 2003, (3 pages).
"Social Nets Find Friends in VCs," Joanna Glasner, http://www.wired.com/news, Nov. 17, 2003, pp. 1-3.
"Social Network Fragments: An Interactive Tool for Exploring Digi¬ tal Social Connections." Danah Boyd, Jeff Potter. Sketch at SIG-GRAPH 2003. San Diego, California: ACM, Jul. 27-31, 2003.
"Social Networking for Business: Release 0.5," Esther Dyson, Esther Dyson's Monthly Report, vol. 21, No. 10, Nov. 25, 2003, www.edventure.com, (36 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004.
"Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, p. 55ff.
"Spoke Builds on Social Networking Patent Portfolio," Spoke Builds on Social Networking Patent Portfolio, reprinted from http://www.intemetnews.com/ent-news/printsphp/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.
"Support Vector Machines," Marti Hearst, IEEE Intelligent Systems, Jul./Aug. 1998, pp. 18-28.
"SWM-based Filtering of E-mail Spam with Content-specific Misclassification Costs," Aleksander Kolcz et al., TextDM'200I (IEEE ICDM-200I Workshop on Text Mining), San Jose, CA, 2001, pp. 1-14.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"Technical Solutions for Controlling Spam," Shane Hird, Proceed¬ ings of Aug. 2002 , Melbourne, Sep. 4-6, 2002, 17 pages.
"Technology Journal-Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat-Instant Messaging is Taking Off, and for Some Users It's Nuzzling Out the Phone," Nick Wingfield, Asian WSJ, Sep. 2000.
"Telstra targets Net spammers," J. Dudley, news.com.au, Dec. 2, 2003, 2 pages.
"Text Categorization with Support Vector Machines: Learning with Many Relevant Features," Thorsten Joachims, University of Dortmund, Computer Science Dept., LS-8 Report 23, 1998, 18 pages.
"The first Social Software . . . A true Social Adventure," Huminity-Social Networking, Chat Software, Create Personal Free Blogs and My Group . , reprinted from http://www.huminity.com/ printed on Nov. 5, 2004 (2 pages ).
"The LP Wireless Messenger", Messenger Documentation, [online]. LP Wireless, Inc., 2001 [retrieved on Nov. 2, 2002]. Retrieved from the Internet, http://lpwireless.com/messengerhelp.htm>, pp. 1-7.
"Trillian Discussion Forums-HOWTO: Import ICQ 2003a Contact List," retrieved Apr. 29, 2004 from the World Wide Web: http://trillian.cc/forums/showthread.php?s+threadid=36475, pp. 1-2.
"Using Active Directory Service", from Chapter 5, Microsoft Windows 2000 Administrators Pocket Consultant, by William R. Stank (1999). Retrieved from http://www.microsoft.com/technet/prodtechnol/ad/windows2000/evaluate/05w2kadb.asp?fr., pp. 1-6.
"Welcome to Huminity World of Connections," Huminity-Home, reprinted from http://web.archive.org/web/20030228131435/www.huminity.com/default.php?intemationa . . printed on Nov. 5, 2004 (available on Feb. 2, 2003) (1 page).
"Will You Buy a Car From This Man?," Leander Kahney, Oct. 6, 2003, pp. 1-3.
"Working with Active Directory Domains", from Chapter 5, Microsoft Windows 2000 Administrators Pocket Consultant, by Wil¬ liam R. Stank (1999). Retrieved from http://www.microsoft.com/technet/prodtechnol/ad/windows2000/evaluate/05w2kadb.asp?fr., pp. 1-10.
"YAHOO! Messenger Makes the World a Little Smaller, More Informed", pp. 1-2, Jun. 21, 1999.
Alan Cohen, "Instant Messaging", Apr. 13, 1999, PC Magazine, PC Labs, 2 pages.
America Online Inc., "AOL Instant Messenger", Aug. 29, 2000, Internet: www.aol.com/aim/.
America Online Inc., New AIM 4.7, Sep. 27, 2001, Internet: http://aim.aol.com.
CNET Networks Inc., "PopUp Killer", Sep. 13, 2001, Internet: download. cnet.com/downloads/0-10059-100-6932612.html. International Search Report for International Application No. PCT/US03/15715, mailed Aug. 14, 2003.
International Search Report mailed Aug. 30, 2005 for International Application No. EP03731244.
Supplementary European Search Report issued in European Appli¬ cation No. EP05728303, dated Jan. 9, 2009, (4 pages).
Ed Bott and Ron Person, Using Windows 95 with Internet Explorer 4.0, Feb. 17, 1998, Que, Special Edition.
Eschenburg, Wo laufen sie denn?, Oct. 26, 1998, pp. 92-95. Home-tribe.net, http: //washingtondcstribe_met/message/24434d lb—817b -4580-aa42 -3bffal5 f26a?page=1 (4 total pages).
http://www.friendster.com (17 pages).
International Search Report, Application Serial No. PCT/US05/45663, dated Apr. 11, 2008, 10 pages.
J.C. Cannon, "Design Guide for Directory-Enabled Applications," [online], Apr. 2001 [retrieved on May 13, 2003]. Retrieved from the Internet <http://msdn.microsoft.com/library/en-us/dnactdir/html/deal.asp? frame=true>, pp. 1-18.
Kohda et al., IMPP: A new Instant Messaging Standard and Its Impact on Internet Business, Dec. 2000, Fujitsu Sci. Tech. J., 36, 2 pp. 147-153.
McKendrick, Joseph; "Internet Call Centers: New Era in Customer Service", Feb. 2002; VIO, n2, pp. 22(4).

(56) References Cited

OTHER PUBLICATIONS

Microsoft Corporation, "Active Directory Services Interface in the Microsoft Exchange 5.5 Environment," [online], Nov. 1997 [retrieved on May 13, 2003]. Retrieved from the Internet <http://msdn.microsoft.com/library/en-us/dnactdir/html/msdnadsiexch.asp?frame=true>, pp. 1-12.
Microsoft Corporation, "Comparing Microsoft Active Directory to Novell's NDS," [online], Sep. 1998 [retrieved on May 5, 2003]. Retrieved from the Internet <http://msdn.microsoft.com/library/en-us/dnactdir/html/msdn activedirvsnds.asp?frame=true>, pp. 1-17.
Microsoft Corporation, "Introduction to Active Directory Application Mode," Microsoft Windows Server 2003, Aug. 2002, pp. 1-13.
Microsoft Corporation, "Using ADSI LDAP, and Network Management Functions With Active Directory," [online], Feb. 2002 [retrieved on May 13, 2003]. Retrieved from the Internet <http://msdn.microsoft.com/library/en-us/dnactdir/html/BuildingADApps.asp?frame=true>, pp. 1-9.
Mutton, Paul, "PieSpy Social Network Bot Inferring and Visualizing Social Networks IRC," Dec. 4, 2003, Internet Archive Wayback Machine http://web.archive. org/web/20031204185952/http://jibble.org/piespy, 17 pages.
Neo Mai, Ken Neo. "Buying and selling on the internet; [Computimes, 2 Edition]." New Straits Times. Kuala Lumpur: Jun. 28, 2001. p. 53.
Notice from the European Patent Office dated Oct. 1, 2007 concerning business methods-Journal of the European Patent Office, vol. 30, No. 11 (Nov. 1, 2007) pp. 592-593, XP007905525 ISSN: 01709291.
Office Action, of U.S. Appl. No. 11/237,718 dated Apr. 2, 2009, 20 pages.
Office Action, of U.S. Appl. No. 11/238,110, dated Nov. 29, 2007, 11 pages.
Office Action, of U.S. Appl. No. 11/238,110, dated Jul. 9, 2008, 11 pages.
Office Action, of U.S. Appl. No. 11/238,110, dated Oct. 9, 2008, 11 pages.
R. Movva & W. Lai, "MSN Messenger Service 1.0 Protocol", Aug. 1999, Internet Draft, http://toolsietf. org/id/draft-movva-msn-messenger-protocol-oo.bct, 28 pages.
Reichard, K., "AOL, ICQ to Interoperate-But in a Limited Fashion," Oct. 30, 2002, InstantMessagingPlanet, available at www/instantmes sagingplanet. com/publi c/artic le .php/1490771.
Ryze home page, www.ryze.com, Dec. 21, 2003, available at http://web.archive .org/web/20031221010006/http://ryze scorn, printed Mar. 16, 2005, 13 pages.
VisiblePath webpages, www.visiblepath.org, Dec. 3, 2003, available at http ://web. archive. org/web/20031203132211/http ://www.visiblepath.com, printed Mar. 16, 2005, 5 pages.
WebmasterWorld.com Inc., "HTML and Browsers", Mar. 5, 2001, Internet: www.webmaster.com/forum21/367.htm.
ZeroDegrees home page, www-zerodegrees.com, Jan. 24, 2004, available at http://web.archive.org/web/20040204153037/www.zerodegrees.com/home.htm, printed Mar. 16, 2005, 2 pages.
Flicker Geotagging, <http://www.helio.com/mobile-features/mobile-gps-navigation/flickrgeotagging>, downloaded on Mar. 30, 2009 (1 page).
Menkens et al., "IMS Social Network Application with J2ME Compatible Push-to-Talk Service," The International Conference on Next Generation Mobile Applications, Services and Technologies, Sep. 12-14, 2007, pp. 70-75.
Mobile Location-Based Services—4th Edition, Table of Contents (2009), http://www.reportlinker.com/p0126704/reportlinker-adds-mobile-location-based-services-4thedition.html (5 pages).
Multi-User Dungeon ("MUD"), <http://en.wikipedia.org/wiki/MUD>, downloaded on Mar. 23, 2009 (9 pages).
Mary Beth Marklein, "Students have 'away' with words", Mar. 28, 2004, USA Today, "http://www.usatoday.com/tech/news/2004-03-28-away-messages-usat_x.htm", all pages.
International Search Report and Written Opinion dated Feb. 20, 2006, for International Application No. PCT/ US05/07204.
Office Action, of U.S. Appl. No. 11/238,130, dated Apr. 14, 2009, 35 pages.
Office Action, of U.S. Appl. No. 11/238,130, dated Nov. 13, 2008, 45 pages.
Office Action, of U.S. Appl. No. 11/238,130, dated Jul. 3, 2008, 22 pages.
Office Action of U.S. Appl. No. 11/238,129, mailed May 28, 2008, 70 pages.
Examiner's Answer in response to Appeal Brief of U.S. Appl. No. 11/283,129, mailed Jan. 14, 2009, 85 pages.
Office Action, of U.S. Appl. No. 11/238,130, dated Nov. 24, 2009, 41 pages.
International Search Report dated Feb. 4, 2010, for International Application No. PCT/US2009/054886.
Office Action, of U.S. Appl. No. 10/134,437, dated Sep. 18, 2008, 32 pages.
Office Action, of U.S. Appl. No. 10/134,437, dated Mar. 10, 2009, 31 pages.
Office Action, of U.S. Appl. No. 10/184,002, dated Jan. 8, 2008, 19 pages.
Notice of Allowance for U.S. Appl. No. 10/184,002, dated Jul. 24, 2008, 20 pages.
Office Action, of U.S. Appl. No. 11/015,424, dated Nov. 3, 2008, 49 pages.
Office Action, of U.S. Appl. No. 11/015,424, dated Mar. 19, 2008, 43 pages.
Courter et al., "Mastering Microsoft Outlook 2000 Premium Edition," Sybex Inc., Alameda, California, 2000, pp. 167-169, ISBN 0-7821-2676-6.
Office Action, of U.S. Appl. No. 10/633,636, dated Oct. 11, 2006.
Office Action, of U.S. Appl. No. 10/184,002, dated Jan. 9, 2007.
Office Action, of U.S. Appl. No. 10/146,814, dated Dec. 11, 2006, 15 pages.
Office Action, of U.S. Appl. No. 10/134,437, dated Feb. 11, 2008, 34 pages.
International Search Report issued in Application No. PCT/US05/08476, dated Oct. 16, 2009, 11 pages.
Office Action, of U.S. Appl. No. 11/017,204, dated Dec. 12, 2007, 13 pages.
Office Action, of U.S. Appl. No. 10/146,814, dated Jul. 2, 2007, 18 pages.
Office Action, of U.S. Appl. No. 11/017,204, dated Jun. 23, 2008, 33 pages.
Office Action, of U.S. Appl. No. 10/981,460, dated Aug. 20, 2008, 24 pages.
Notification of Transmittal of the International Search Report, International Application No. PCT/US03/36793, dated Apr. 22, 2004, 7 pages.
Office Action, of U.S. Appl. No. 10/334,056, dated Nov. 5, 2007, 21 pages.
Office Action, of U.S. Appl. No. 10/334,056, dated May 21, 2007, 7 pages.
Office Action, of U.S. Appl. No. 10/334,056, dated May 10, 2006, 7 pages.
Office Action, of U.S. Appl. No. 10/334,056, dated Oct. 31, 2005, 7 pages.
Office Action, of U.S. Appl. No. 10/334,056, dated Jul. 6, 2005, 24 pages.
Office Action, of U.S. Appl. No. 10/334,056, dated Nov. 29, 2004, 22 pages.
Office Action, of U.S. Appl. No. 10/334,056, dated May 12, 2008, 22 pages.
Office Action, of U.S. Appl. No. 12/815,847, dated Jul. 21, 2011, 53 pages.
Office Action, of U.S. Appl. No. 12/815,847, dated Nov. 9, 2011, 15 pages.
Office Action, of U.S. Appl. No. 12/815,847, dated Apr. 27, 2012, 40 pages.
International Search Report for International Application No. PCT/US03/15715, mailed Aug. 14, 2003.
U.S. Appl. No. 11/238,130, entitled Identifying Users Sharing Common Characteristics, filed Sep. 29, 2005, 39 pages.

(56) References Cited

OTHER PUBLICATIONS

Home-Tribe.net, http://washingtondc.trib.net/message/24434d1b-817b-4580-aa-42-3bffa15f26a?page=1 (4 total pages).
U.S. Appl. No. 11/238,130, Mar. 15, 2010, Notice of Allowance.
U.S. Appl. No. 12/581,669, Jun. 29, 2010, Notice of Allowance.
U.S. Appl. No. 12/815,847, Sep. 18, 2013, Office Action.
U.S. Appl. No. 12/986,121, Feb. 1, 2013, Office Action.
U.S. Appl. No. 12/986,121, Sep. 3, 2013, Notice of Allowance.
U.S. Appl. No. 13/615,182, Feb. 22, 2013, Office Action.
U.S. Appl. No. 13/615,182, Jun. 6, 2013, Office Action.
U.S. Appl. No. 13/615,182, Oct. 25, 2013, Office Action.
U.S. Appl. No. 13/615,198, Feb. 22, 2013, Office Action.
U.S. Appl. No. 13/615,198, Jun. 10, 2013, Office Action.
U.S. Appl. No. 13/615,198, Oct. 28, 2013, Office Action.
U.S. Appl. No. 13/615,246, Sep. 13, 2013, Office Action.
U.S. Appl. No. 13/615,254, Sep. 13, 2013, Office Action.
U.S. Appl. No. 13/615,263, Sep. 19, 2013, Office Action.
U.S. Appl. No. 13/768,440, Jul. 19, 2013, Office Action.
U.S. Appl. No. 13/783,597, Nov. 13, 2013, Office Action.
U.S. Appl. No. 13/783,946, Nov. 14, 2013, Office Action.
U.S. Appl. No. 13/794,482, Sep. 19, 2013, Office Action.
U.S. Appl. No. 12/815,847, Dec. 6, 2013, Notice of Allowance.
U.S. Appl. No. 12/986,121, Dec. 5, 2013, Notice of Allowance.
U.S. Appl. No. 13/794,482, Jul. 8, 2014, Notice of Allowance.
U.S. Appl. No. 12/815,847, Feb. 13, 2014, Notice of Allowance.
U.S. Appl. No. 13/615,182, Mar. 20, 2014, Office Action
U.S. Appl. No. 13/615,198, Mar. 20, 2014, Office Action.
U.S. Appl. No. 13/615,246, Feb. 19, 2014, Notice of Allowance.
U.S. Appl. No. 13/615,254, Feb. 20, 2014, Notice of Allowance.
U.S. Appl. No. 13/615,263, Feb. 24, 2014, Office Action.
U.S. Appl. No. 13/615,263, June. 10, 2014, Notice of Allowance.
U.S. Appl. No. 13/768,440, Mar. 28, 2014, Notice of Allowance.
U.S. Appl. No. 13/768,440, Apr. 23, 2014, Notice of Allowance.
U.S. Appl. No. 13/783,946, Mar. 18, 2014, Office Action.
U.S. Appl. No. 13/794,482, Feb. 27, 2014, Office Action.
U.S. Appl. No. 13/615,182, Nov. 4, 2014, Office Action.
U.S. Appl. No. 13/615,198, Nov. 3, 2014, Office Action.
U.S. Appl. No. 13/783,946, Oct. 20, 2014, Office Action.

* cited by examiner

300

600

700

200

600

IDENTIFYING USERS SHARING COMMON CHARACTERISTICS

CROSS REFERENCE TO RELATED APPLICATIONS

This application is a continuation of U.S. application Ser. No. 12/815,847 filed on Jun. 15, 2010, which is a continuation of U.S. application Ser. No. 11/238,130, filed on Sep. 29, 2005, now issued as U.S. Pat. No. 7,765,265, which claims the benefit of U.S. Provisional Application Ser. No. 60/679,652, titled "Processing Information Describing Electronic Messaging Users," and filed May 11, 2005, and U.S. Provisional Application Ser. No. 60/710,670, titled "Identifying Users Sharing Common Characteristics," and filed Aug. 24, 2005. This application is related to U.S. patent applications being filed concurrently on Sep. 29, 2005, and titled "Searching Electronic Content in Instant-Messaging Applications," and titled "Personalized Location Information for Mobile Devices." The entire contents of all of the above applications are hereby incorporated by reference in their entirety.

TECHNICAL FIELD

This application relates to the identification of users of an instant-messaging system that share common characteristics.

BACKGROUND

In instant-messaging applications, users may communicate with each other by exchanging instant messages. An individual user may have a buddy list that includes the names of other users, known as "buddies," with whom the user may communicate regularly. The user may send instant messages to any of the buddies, as well as other users not included in the buddy list, that are logged on to their respective computing stations. Any one of these buddies may store electronic content that can be shared with other users. For example, a buddy may store an "away" message that can be provided as an auto-response to other users to indicate that the buddy is presently away from his or her computing station or is otherwise unavailable to send and receive instant messages.

Away messages can serve several purposes. Many people use them to let others, such as their buddies, know exactly where they are. Others use away messages to provide creative expression, such as by publishing the lyrics of the song they just wrote or a funny quote they just heard in a movie. Recent studies have shown that individuals of certain age groups (such as college-aged adults) not only invest a fair amount of time creating multiple away messages per day, but they also spend a great deal of time reading the away messages of their buddies.

A very common use of away messages is to post your current location or activity so that buddies can easily keep track of where you are and be informed enough to join in your activity if they are up to it. Users often trust this service as a place to keep their personal information, such as contact information, so their friends can get in touch with them at any time. They use it to share information such as links to pictures, web logs (blogs), funny articles, declarations of love to a boyfriend/girlfriend, a countdown until the day they graduate, and other things of value. It is a quick way to provide a glimpse into the user's life and, in most cases, it also may provide a way to get more information about the user if a buddy wants to spend the time to do so.

SUMMARY

In one general aspect, displaying electronic information in an instant-messaging application includes accessing a first electronic message that provides information describing a first user that has an identifier included in a set of identifiers of users of an instant messaging application. A second electronic message that provides information describing a second user that has an identifier included in the set of identifiers of users of an instant messaging application is accessed. Content contained within the first and second electronic messages is analyzed to determine that at least a portion of the content is common to both the first and second electronic messages. Based upon the content analysis, an indication of whether the first and second electronic messages include common content is provided to the user.

Implementations may include one or more of the following features. For example, indicating that the first and second electronic messages included common content may include audibly indicating that the first and second electronic messages include common content. Audibly indicating that the first and second messages include common content may include playing a recorded message indicating that the first and second messages include common content, or leaving a voice message to this effect on a voicemail system used by the user.

Indicating that the first and second electronic messages include common content may include visually indicating that the first and second electronic messages include common content. Visually indicating that the first and second electronic messages include common content may include highlighting the identifiers of the first and second users within the set of identifiers, or displaying a graphical icon in proximity to the identifiers of the first and second users within the set of identifiers.

Visually indicating that the first and second electronic messages include common content also may include adding identifiers of the first and second users to a group identifying users with electronic messages that include the common content. The group may be added to the set of identifiers, for example, when more than a threshold number of identifiers of users are to be included in the group.

Indicating that the first and second electronic messages include common content may include displaying a graphical user interface that includes indications of the first and second users as users with electronic messages that include common content.

At least a portion of the first and second electronic messages may be provided to the user. The first and second users both may be available to send and receive electronic messages, or at least one of the first user and the second user may not be available to send and receive electronic messages. The first and second electronic messages may indicate locations of the first and second users, respectively.

Analyzing content contained within the first and second electronic messages may include analyzing the content to determine whether the content indicates that the first and second users are attending a common event. Analyzing content contained within the first and second electronic messages also may include analyzing the content to determine whether the content indicates that the first and second users are participating in a common activity, share a common characteristic, are at a common location, or are within a threshold distance from one another.

Accessing the first electronic message may include accessing the first electronic message from a store of electronic messages that provide information describing the first user.

Other electronic messages for other users may be accessed. Content included in the other electronic messages may be analyzed to determine whether one or more of the other electronic messages include the common content. An indication that the one or more of the other messages include the common content may be provided to the user.

A change in the first electronic message may be detected before accessing the first electronic message. The set of users may be a list of users for which presence information is monitored, or a set of users sharing a common characteristic.

In another general aspect, displaying electronic information in an instant-messaging application includes detecting that a first user that has an identifier included in a set of users of an instant messaging application is in physical proximity to a geographic location. A detection that a second user that has an identifier included in the set of users of the instant messaging application is in physical proximity to the geographic location is made. Without receiving a request, an indication that the first and second users are each in physical proximity to the geographic location is provided.

Implementations may include one or more of the following features. For example, detecting that the first user is in physical proximity to the geographic location may include detecting that the first user is within a threshold distance from the geographic location at a time when the detection is made. Detecting that the second user is in physical proximity to the geographic location may include detecting that the second user is within a threshold distance from the geographic location at a time when the detection is made.

Detecting that the first user is in physical proximity to the geographic location may include detecting that the first user is in physical proximity to the geographic location based on GPS signals indicating a position of the first user, or based on information included in an electronic message describing the first user.

A detection that the first user is not in physical proximity to the geographic location may be made. The indication that the first and second users are each in physical proximity to the geographic location may be updated based on the detection that the first user is not in physical proximity to the geographic location.

A detection that the user is in physical proximity to the geographic location may be made. Indicating that the first and second users are each in physical proximity to the geographic location may include indicating that the first and second users are each in physical proximity to the user. Detecting that the user is in physical proximity to the geographic location may include doing so based on GPS signals indicating a position of the user, or based on information included in an electronic message describing the user. Detecting that the user is in physical proximity to the geographic location may include receiving an indication that the user is in physical proximity to the geographic location from the user.

The geographic location may represent at least one from a group including a building, a street, an intersection, a business, and a residence. The set of users may be a list of users for which presence information is monitored, or a set of users sharing a common characteristic.

The details of one or more implementations are set forth in the accompanying drawings and the description below. Other features, objects, and advantages will be apparent from the description and drawings, and from the claims.

DETAILED DESCRIPTION

Users that share common characteristics are identified based on electronic content that is stored in association with the users. The electronic content of a user may be an electronic message indicating the availability of the user to send and receive electronic messages, or information describing the user. The users may be said to match when at least a portion of the electronic content of each of the users matches. For example, the electronic content may identify locations of the users, and the users may be identified when their locations match. The users may be included in a contact list, and an indication of the common characteristics may be presented on an interface in which the contact list is presented. Alternatively, the users may be included in another group of users that do not form a contact list, in which case the indication of the common characteristics may be presented on a standalone interface. For example, identifiers of the users with matching electronic content may be displayed in the participant list in a special group, or with nearby indications of the matching content.

Figure 1:
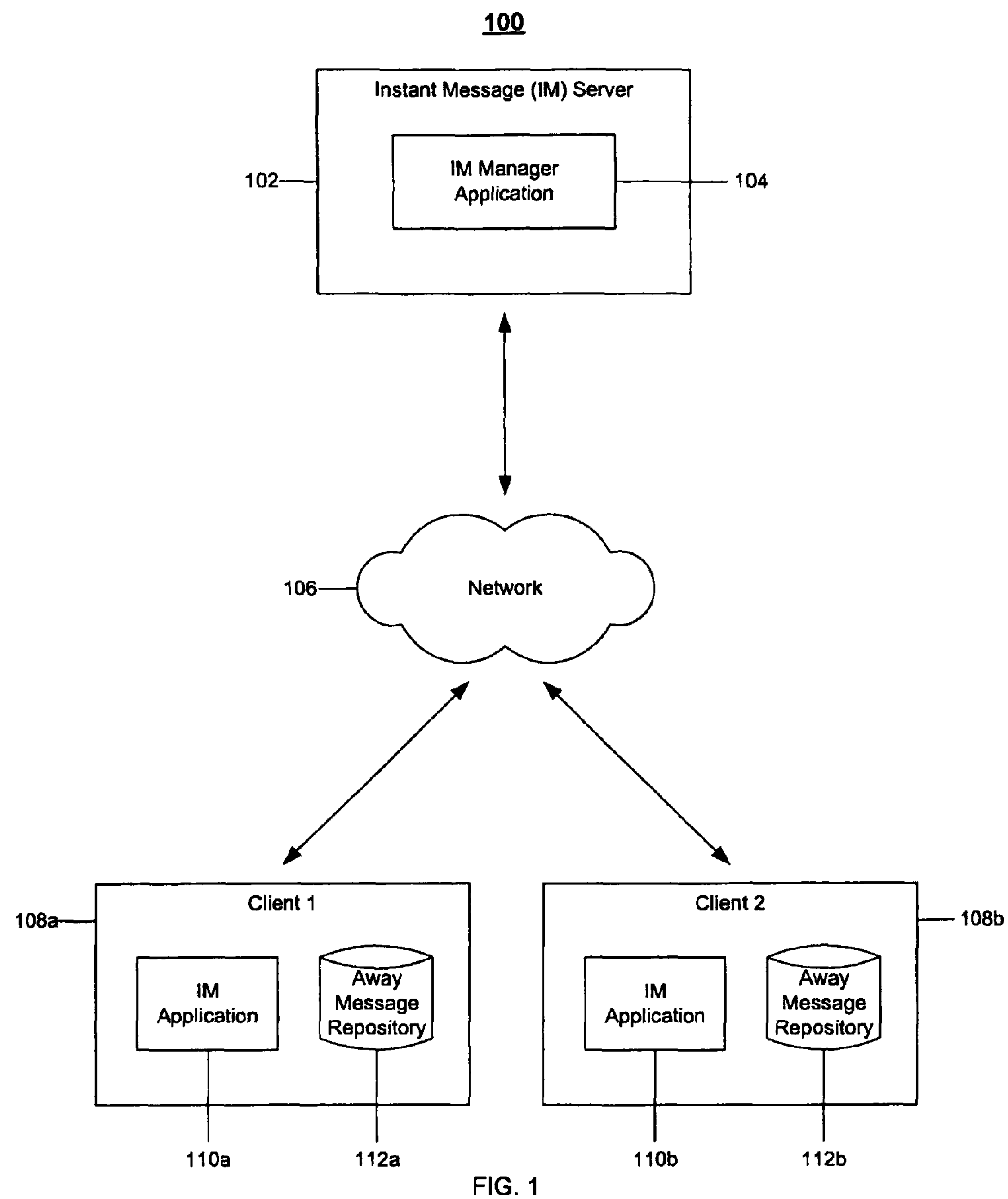
FIG. 1 is a block diagram of a networking system that is used for communication of electronic messages.

FIG. 1 is a block diagram of a networking system 100 that is used for transmission of instant messages, according to one implementation. In this implementation, the system 100 includes an instant message (IM) server 102, a network 106, and client devices 108*a* and 108*b*. The IM server 102 is coupled to both the client device 108*a* and the client device 108*b* through the network 106. The network 106 is a wide-area network (WAN) in some implementations, and a local-area network (LAN) in others. The client devices 108*a* and 108*b* may each include a computing device, such as the computing device shown in FIG. 11. In certain implementations, the client devices 108*a* and 108*b* may be mobile devices, such as portable computers, cellular telephones, or personal digital assistants (PDAs).

During operation, the client device 108*a* may initiate an instant-messaging session with the client device 108*b* and send one or more IMs to the client device 108*b* during the instant-messaging session. To do so, the client device 108*a* invokes an IM application 110*a*. In one implementation, a first user manually invokes the IM application 110*a*. In another implementation, the client device 108*a* automatically invokes the IM application 110*a* at start-up. The client device 108*a* also may include various other applications that operate at run-time, such as word-processing applications, web-browser applications, or mail applications. When a first user on the client device 108*a* wishes to begin an instant-messaging session with a second user on the client device 108*b*, the first user initiates a request. This request includes an address associated with the client device 108*b*. The IM application 110*a* on the client device 108*a* sends this request to an IM manager application 104 on the IM server 102 using the network 106.

Upon receipt of this request from the client device 108*a*, the IM manager application 104 uses the address contained within the request to locate the client device 108*b*. The IM manager application 104 then routes the request to an IM application 110*b* on the client device 108*b* using the network 106. The IM application 110*b* then processes this request and initiates a new instant-messaging session with the IM application 110*a* on the client device 108*a*. The second user on the client device 108*b* is then notified by the IM application 110*b* of the new session, and the first and second users of the client devices 108*a* and 108*b* are capable of exchanging IMs during the course of the instant-messaging session. The client device 108*b* also may contain other applications, such as word-processing applications, web-browser applications, or mail applications.

In one implementation, the client device 108*a* is capable of sending messages to and receiving messages from the client device 108*b* through the network 106 without the use of the IM server 102. In this implementation, the IM applications 110*a* and 110*b* manage all of the IM functionality on the client devices 108*a* and 108*b*, respectively. Each of the IM applications 110*a* and 110*b* is capable of authenticating and locating other client devices to enable the exchange of messages to and from the client devices 108*a* and 108*b*, respectively.

The client devices 108*a* and 108*b* include away message repositories 112*a* and 112*b*. The away message repository 112*a* includes one or more away messages that have been specified by a user of the client device 108*a*. Each of the away messages may include information describing the user. For example, an away message may include an indication of a current location or activity of the user. In addition, the away message may include an indication of the availability of the user to send and receive instant messages. Furthermore, the away message may be identifiable by a title that may be considered to be part of the away message. In one implementation, the away message may include a profile of the user. The away messages included in the away message repositories 112*a* and 112*b* may include audio data, video data, graphical data, emoticons, and/or text.

The away message repositories 112*a* and 112*b* may include multiple types of away messages. For example, the repositories 112*a* and 112*b* may include online away messages for a user that are provided when the user is available to send and receive electronic messages. Similarly, the repositories 112*a* and 112*b* may include offline away messages for a user, which are away messages that are provided when the user is not available to send and receive electronic messages. The repositories also may include profiles that include information describing the user. Location away messages, which specify only user location, and mobile away messages, which are used when the client devices 112*a* and 112*b* are mobile devices, also may be stored within the repositories 112*a* and 112*b*.

The user of the client device 108*a* may make one of the away messages stored in the away message repository 112*a* accessible to the client device 108*b* such that the away message may be transferred to the client device 108*b* for processing or for presentation to a user of the client device 108*b*. The user of the client device 108*a* may select one of the away messages from the away message repository 112*a* based on the information included in the away message. If none of the stored away messages include desirable information, then the user may specify a new away message including the desirable information for storage in the repository 112*a*. In some implementations, the user of the client device 108*a* may make multiple away messages included in the repository 112*a* accessible for transfer to the client device 108*b* and other client devices. The away message that is provided to the other client device may depend on an identity of a user of the other client device. For example, a first away message may be provided when the user of the other client device is a mother of the user of the client device 108*a*, and a second away message may be provided when the user of the other client device is a friend of the user of the client device 108*a*.

In one implementation, the away message repositories 112*a* and 112*b* may include old away messages that are no longer applicable to the corresponding users. For example, when the user of the client system 108*a* modifies an original away message, the away message repository 112*a* may maintain a copy of the original away message as well as the modified away message. The old away messages may be made accessible, for example, in the form of a web log (e.g., blog) such that more than just a most recent away message is accessible. Consequently, other users or systems that access the web log may be provided with indications of previous events, activities, locations, or characteristics of the user, as well as indications of more recent events, activities, locations, or characteristics of the user.

In some implementations, the IM application 110*a* or the IM application 110*b* may be configured to respond automatically to instant messages received at the client devices 108*a* and 108*b*. In addition, the IM applications 110*a* and 110*b* may be configured to perform some function identified by the received instant messages. For example, the client device 108*a* may represent a mobile device used by a user, and the client device 108*b* may be a desktop computer used by the user. In such a case, the mobile device may not include the away message repository 112*a*, due to limited storage and processing capabilities. Instead, away messages for the user may be provided from the away message repository 112*b* included in the desktop computer. The user may send an instant message from the mobile device to the desktop computer identifying an away message included in the away message repository 112*b* to be made available to other users. The automatic response to the received instant message may indicate that the identified away message has been made available to the other users.

In some implementations, the users of the client devices 108*a* and 108*b* may specify user information feeds that periodically provide to other users information relating to the users. Alternatively or additionally, the IM server 102 may be configured to aggregate the information relating to the users into the user information feeds on behalf of the users. The user information feed for a user may include any information related to the user, such as entries included in an online journal of the user, an away message of the user, a profile of the user, media files of interest to the user, a playlist specifying an order in which the user listens to or watches the media files, recent communications sent and received by the user, and RSS feeds of interest to the user. The client devices 108*a* and 108*b* or the IM server 102 may periodically provide the user information feeds to other users who have subscribed to the information feeds. Alternatively or additionally, the client devices 108*a* and 108*b* or the IM server 102 may provide only portions of a user information feed that have been added or changed since a previous distribution of the user information feed.

Figure 2:
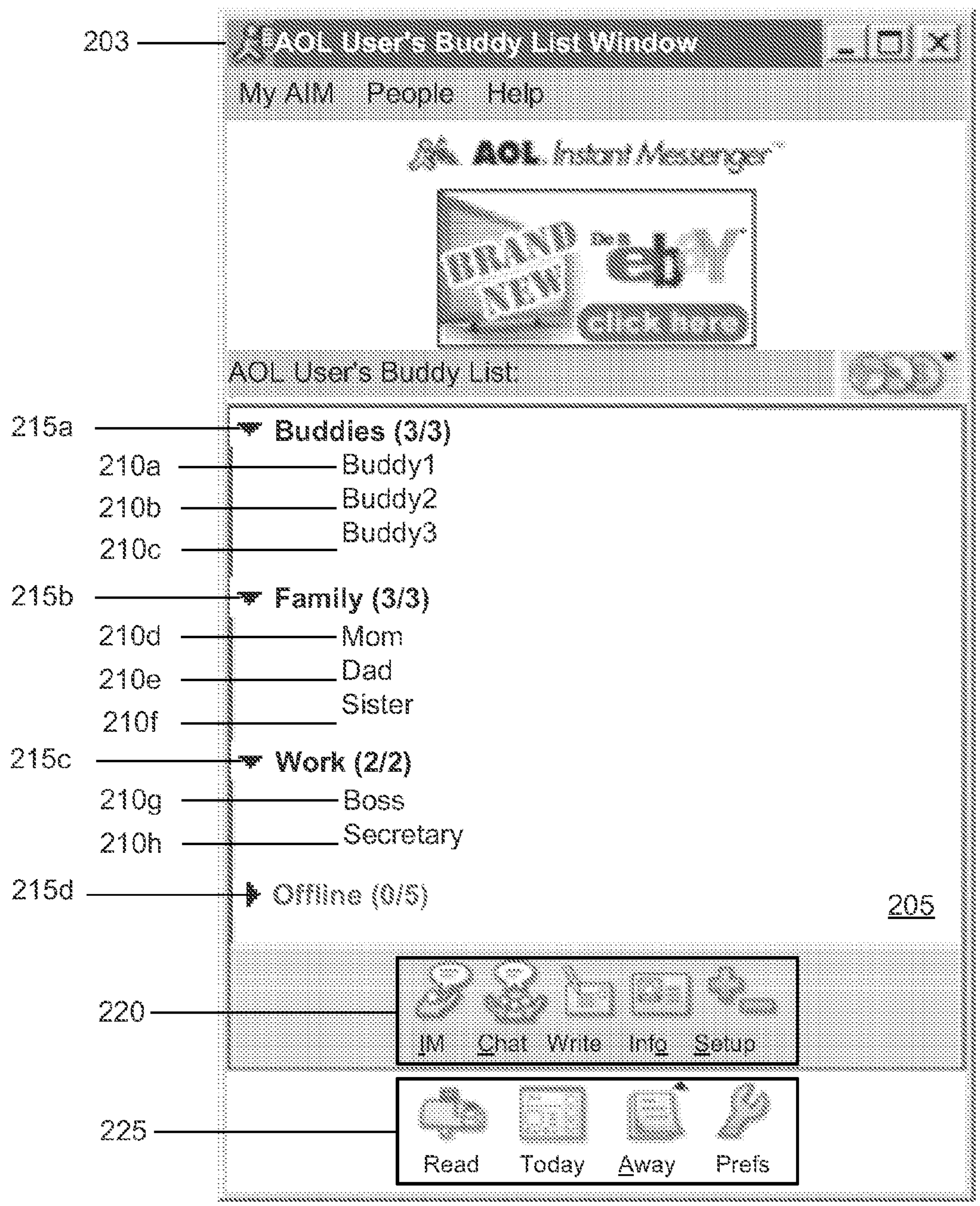
FIG. 2 is an illustration of an interface displaying identifiers of users with whom electronic messages may be exchanged.

Referring to FIG. 2, a participant list interface 200 for a given user displays the identifiers of other selected users of an instant messaging system with which the given user regularly communicates and for which presence information is monitored. The other selected users form a participant list for the given user. Communications with one of the other selected users may be initiated through selection of the identifier for the other user from the participant list. Alternatively or additionally, information describing one of the other selected users may be retrieved through selection of the identifier for the other user from the participant list.

The participant list interface 200 includes a text box 205 that contains the participant list for the given user, who is identified by an identifier "MyUser," as indicated in the title bar 203 of the participant list interface 200. The participant list in the participant list interface 200 includes multiple identifiers 210a-210h. More particularly, the participant list includes the identifiers "Buddy1" 210*a*, "Buddy2" 210*b*, "Buddy3" 210*c*, "Mom" 210*d*, "Dad" 210*e*, "Sister" 210*g*, "Boss" 210*e*, and "Secretary" 210*h*.

Each of the identifiers 210*a*-210*h* may be selected to initiate communication with a corresponding user, or to retrieve information describing the corresponding user. In one implementation, selecting one of the identifiers 210*a*-210*h* displays a menu from which an option for initiating communication with a corresponding user or an option for retrieving information describing the corresponding user may be selected. In another implementation, an icon may be displayed next to one of the identifiers 210*a*-210*h* to indicate that a corresponding user has made available self-descriptive information. The self-descriptive information may include a profile of the other user, an electronic message describing the user, or an electronic message indicating the availability of the other user to send and receive instant messages.

The identifiers within the participant list shown by participant list interface 200 are organized into multiple groups 215*a*-215*d*. Each identifier within the participant list is associated with at least one of the groups 215*a*-215*d*. The participant list includes a "Buddies" group 215*a*, a "Family" group 215*b*, a "Work" group 215*c* and an "Offline" group 215*d*. The identifier 210*a* appears below the heading for the group 215*a* because the identifier 210*a* has been associated with the group 215*a* and the corresponding user is present, that is, logged into the instant messaging system. The heading for each of the groups 215*a*-215*c* indicates the number of users in the group currently logged into the instant messaging system, as well as the total number of users in the group. For example, three out of the three members of the group 215*a* are logged into the instant messaging system for which the participant list interface 200 is displayed. Similarly, the heading for the "Offline" group 215*d* indicates the number of other users on the participant list that are not logged into the system (i.e., 0) and the total number of other users on the participant list (i.e., 8). Typically, when users log into the instant messaging system, identifiers of the users are moved from the "Offline" group 215*d* to one of the other groups 215*a*-215*c*.

The participant list interface 200 also includes controls 220 that enable the given user to communicate with the other selected users corresponding to the identifiers 210*a*-210*e*. For example, the given user may send instant messages, chat invitations, text messages, or e-mail messages to the communications identities referenced in the participant list through use of the controls 220. The controls 220 also enable the user to obtain information describing the other users, as well as to modify the set of other users referenced in the participant list interface 200.

The participant list interface 200 also includes controls 225 that enable the given user to access other information not directly related to sending and receiving instant messages. For example, the given user may use the controls to access e-mail messages or other special features of the instant messaging system. The given user also may use the controls 225 to modify preferences for the participant list interface 200.

Figure 3:
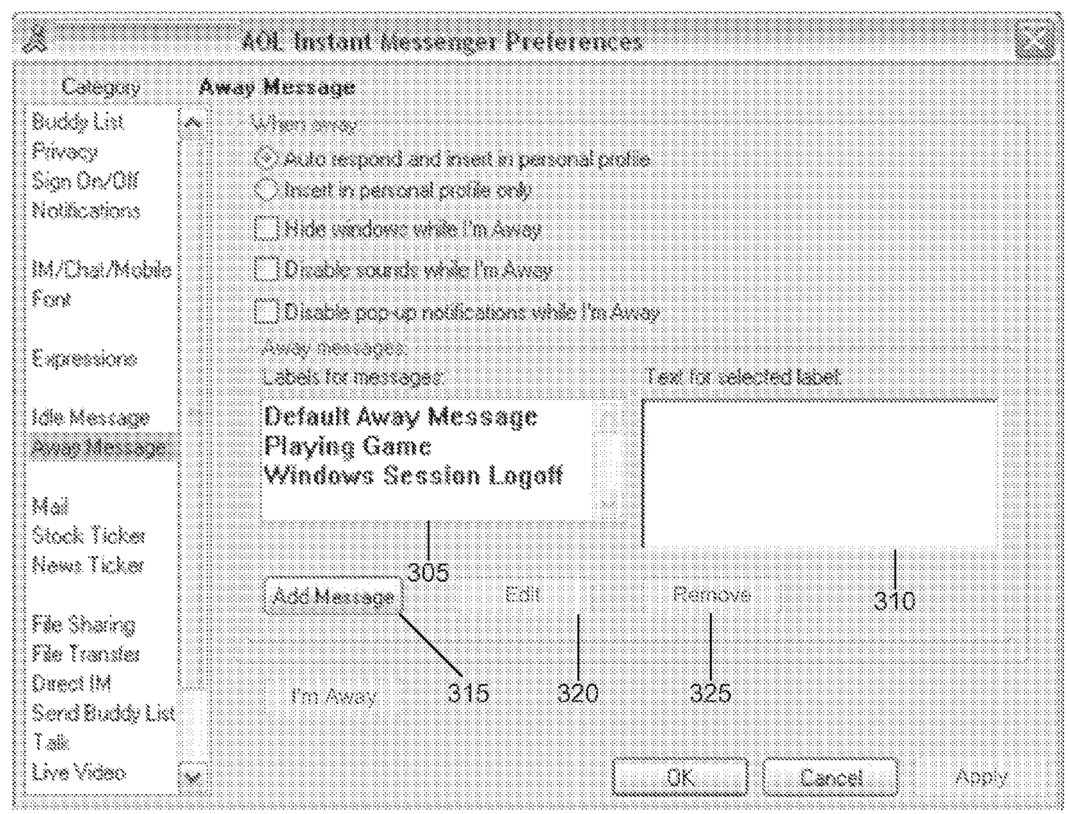
FIGS. 3 and 4 are illustrations of interfaces for specifying an electronic message that describes users of the interfaces.

Referring to FIG. 3, an away message interface 300 enables a user to maintain a set of away messages that may be provided to other users. The away message interface 300 includes a message list 305 and a message text box 310. An add message button 315 enables the user to add an away message to the set of away messages. An edit button 320 enables the user to edit one of the away messages in the set, and a remove button 325 enables the user to remove one of the away messages from the set. The away message to interface 300 also includes other controls 330 that enable the user to specify how the away messages are distributed.

The message list 305 includes a label for each of the away messages. When one of the labels is selected from the message list 305, a corresponding away message is displayed in the message text box 310. In addition, selecting a label from the message list 305 identifies a corresponding away message for distribution to other users desiring information describing the user. Selecting the remove button 325 after one of the away messages has been selected from the list 305 causes a corresponding away message to be removed from the set of away messages. Consequently, the selected label is removed from the list 305.

Figure 4:
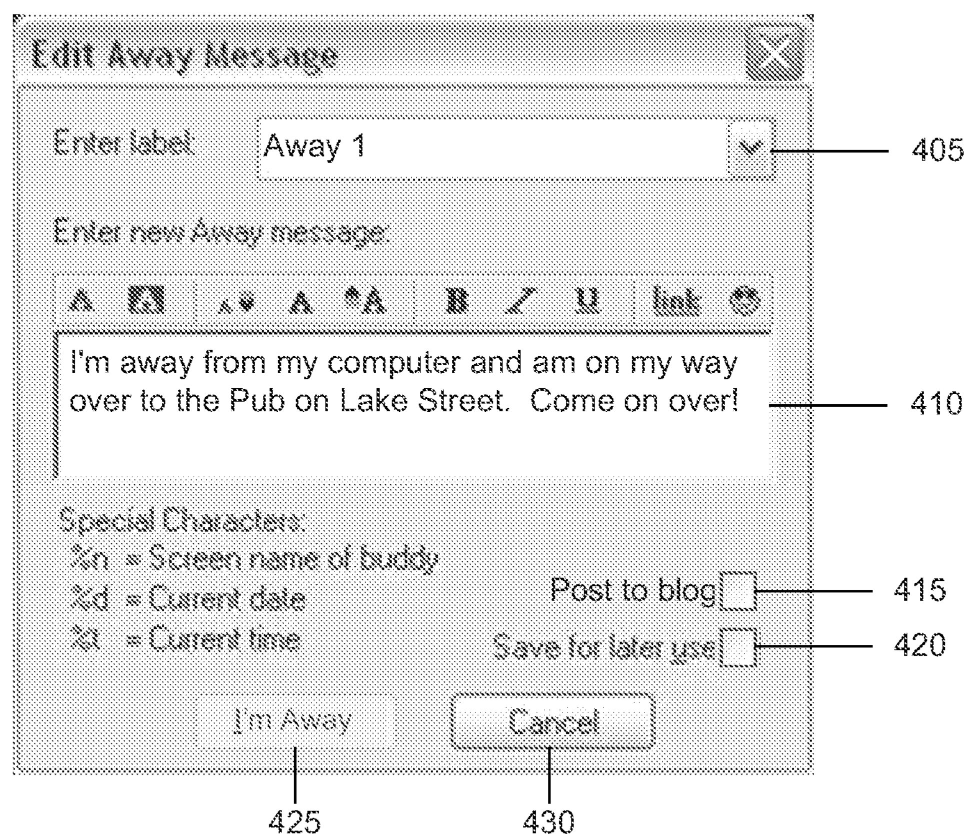

Referring also to FIG. 4, selecting the add message button 315 or the edit button 320 causes an away message specification interface 400 to be displayed. Alternatively or additionally, the away message specification interface 400 may be displayed when a user desires to specify or edit an away message that will not necessarily be included in the set of away messages. In an implementation where an away message for a user includes a profile of the user, other portions of the away message that are not the profile of the user may be specified and edited with the interface 400. In other implementations, the entire away message, including the profile of the user, may be specified or edited with the interface 400. In some implementations, the functionality of the interface 400 may be integrated into the interface 300.

The away message specification interface 400 includes a label text box 405, a message text box 410, and text controls 412 with which the away message may be specified. A checkbox 422 causes the away message to be posted to a web log (blog) of the user when selected. A checkbox 415 causes the away message to be saved for later use when selected. Selecting a button 425 indicates that specification of the away message is complete, and selecting a button 430 dismisses the interface 400 without using the away message.

A label for the away message may be specified in the label text box 405. If the away message is added to the set of away messages, the label specified in the label text box 405 is listed in the message list 305. The text of the away message may be specified in the text box 410. The text controls 412 may be used to change the appearance of the text included in the text box. For example, the size, foreground color, background color, and typeface of the text may be modified with the controls 412. In addition, special characters and features, such as emoticons and hyperlinks may be inserted into the text with the controls 412.

Selecting the checkbox 415 causes the away message to be posted to a blog of the user. In one implementation, an indication of the time at which the away message was specified with the interface 400 also may be posted to the blog. Posting away messages to the blog of the user as the away messages are specified provides a history of previously specified away messages. Because each away message includes information describing the user, the blog includes historical information describing the user at various points in time. Access to the blog, or to particular away messages included in the blog, may be limited by privacy preferences set by the user. For example, the user may indicate that the blog is accessible to all users, to no users, or only to users included in the user's participant list.

Selecting the checkbox 420 causes the away message to be added to the set of away messages displayed in the interface 300. Specifically, the label specified in the label text box 405 is listed in the message list 305, and the text of the away message specified in the text box 410 may be displayed in the message text box 310 when the label is selected from the list 305.

Selecting the button 425 indicates that specification of the away message is complete. As a result, the away message may be provided to users desiring information describing the user. In one implementation, selecting the button 425 selects the away message for distribution to the users and also adds the away message to the set of away messages reflected by the interface 300. In another implementation, selecting the button 425 simply adds the away message to the set of away messages. In such an implementation, the user may use the interface 300 to select the away message for distribution, as described above.

Selecting the button 430 discards the away message that has been specified with the interface 400. For example, if a new message is being created, then the entire message is discarded when the button 430 is selected. If an existing away message is being edited, then changes made to the existing away message are discarded when the button 430 is selected. Selecting either of the buttons 425 and 430 causes the interface 400 to be dismissed.

Figure 5A:
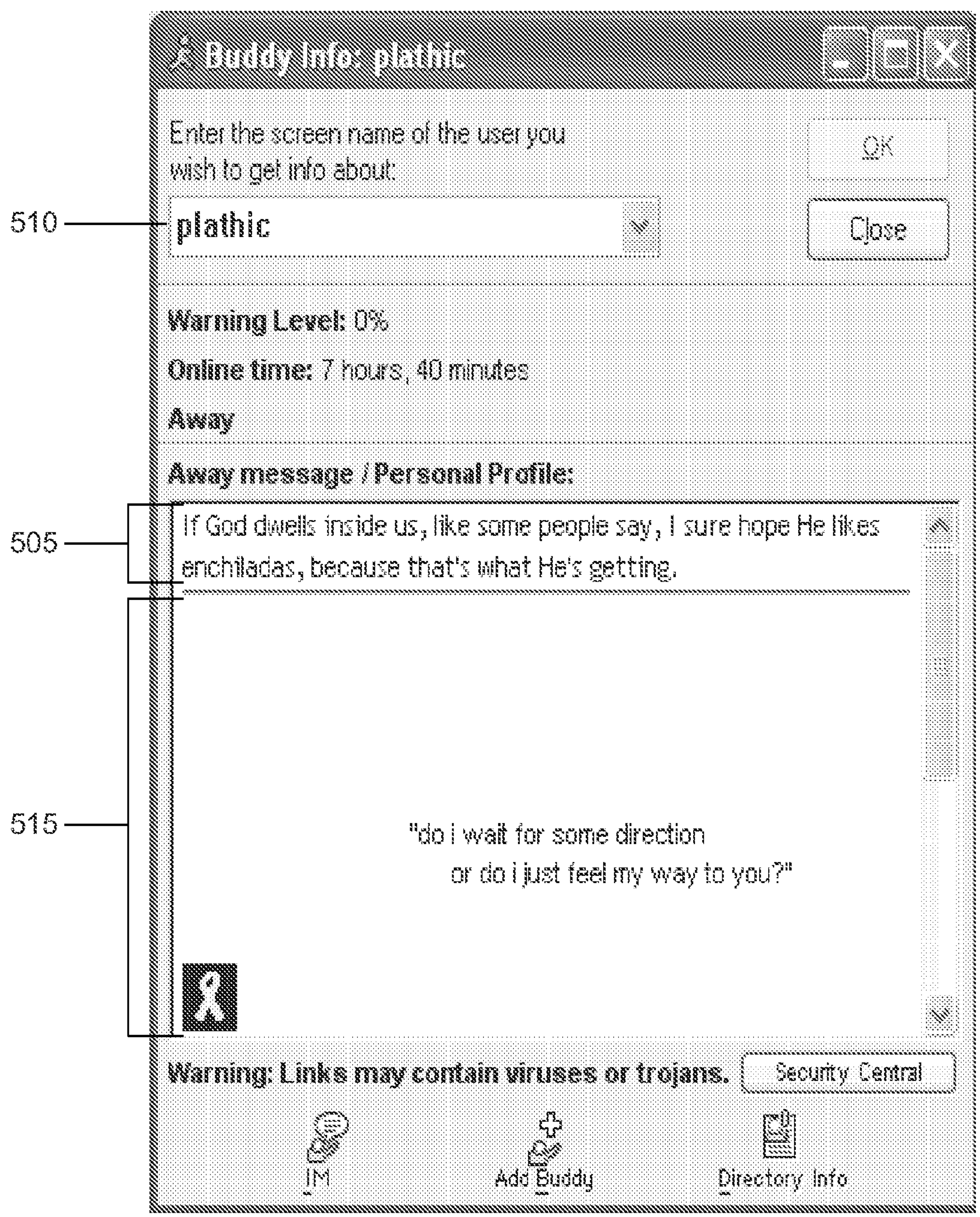
FIGS. 5A and 5B are illustrations of interfaces displaying electronic messages that describe users.
Figure 5B:
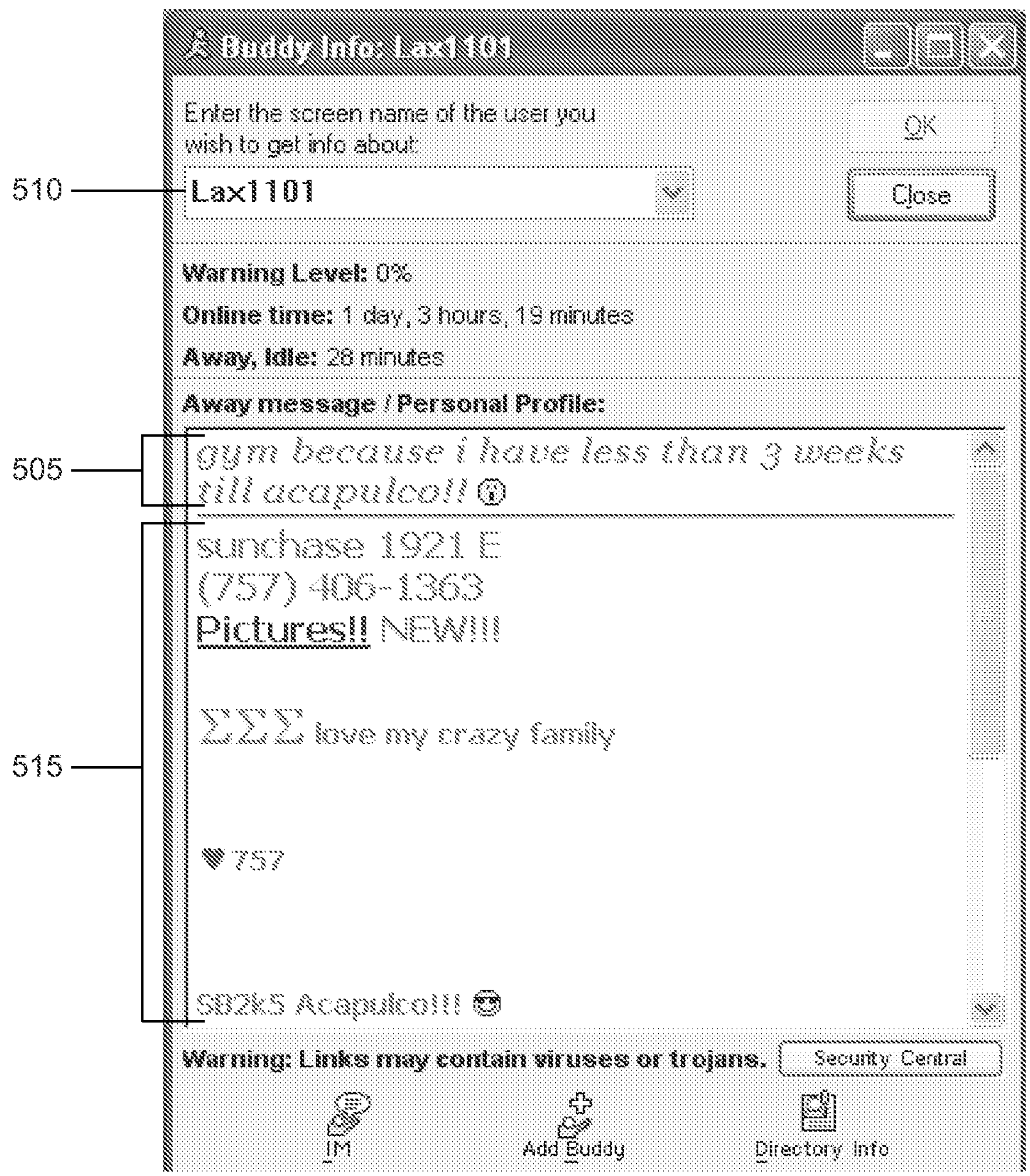

Referring to FIGS. 5A and 5B, an away message display interface 500 displays an away message 505 describing a particular user. The user for which the away message is displayed is identified in a text box 510. The away message display interface 500 also may display separately a profile 515 of the user, particularly when the profile is not included in the away message 505. The combination of the away message 505 and the profile 515 provides information describing the user to an individual for whom the away message display interface 500 is displayed.

Figure 6:
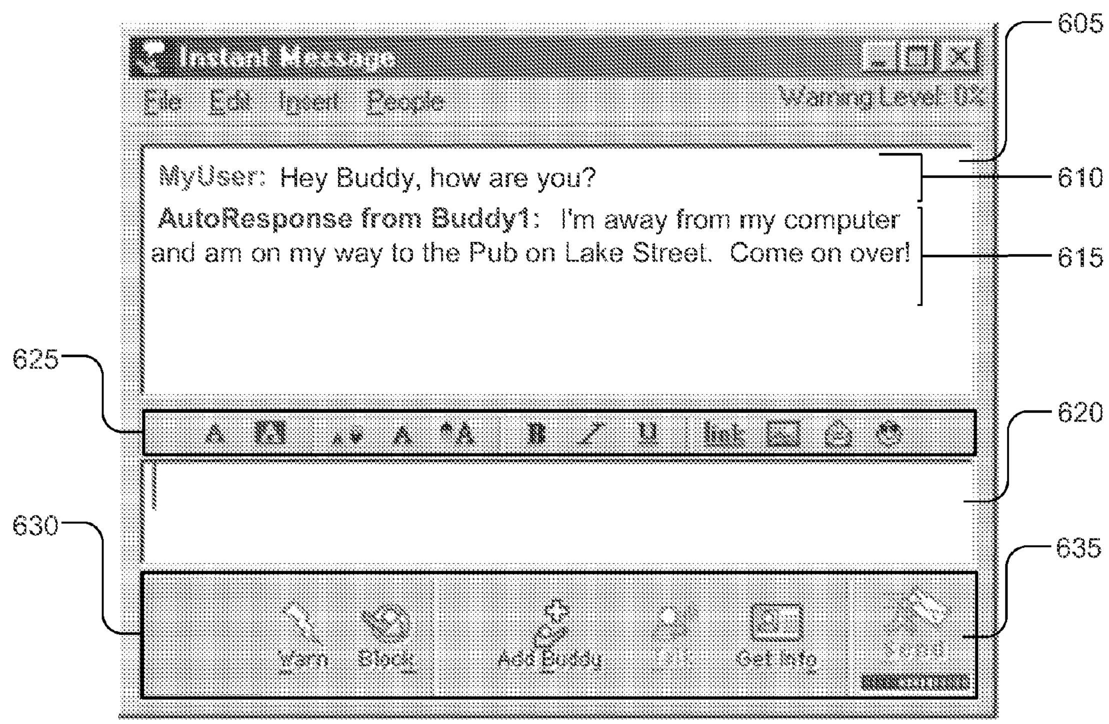
FIG. 6 is an interface for displaying an electronic message describing a user as a response to an electronic message to the user.

Referring to FIG. 6, an away message including information describing a user may be displayed in an instant messaging interface 600, which enables instant messages to be sent and received. The instant messaging interface 600 may be used by a user to exchange communications with another user, such as a user whose screen name is displayed on a participant list interface of the user, such as the participant list interface 200 of FIG. 2A. After a sender of instant messages is notified that a recipient is present and available to send and receive instant messages, the sender may use the instant messaging interface 600 to exchange instant messages with the recipient.

The instant messaging interface 600 includes a message history box 605 that lists the instant messages sent between the sender and the recipient. The message history box 605 also may be referred to as a message transcript box 605. Each message is presented with an indication of an identifier by which the sender or the recipient is identified as the sender of the message. Each message listed in the message history box 605 also includes the text of the instant message sent by the sender or the recipient. For example, the message history box 605 includes a message 610 sent by a user with a screen name "MyUser" and a message 615 sent by a user with a screen name "Buddy1." In one implementation, each message listed in the message history box 605 includes a time stamp of when the message was sent. The users that sent the messages 610 and 615 are the recipient and the sender, respectively. In some implementations, the message history box may include automatically sent messages that were not specified manually by the sender of the recipient. For example, the automatically sent messages may inform the recipient that the sender has not used the instant messaging interface 600 for more than a threshold amount of time.

In typical implementations, the message history box 605 includes only those instant messages sent between the sender and the recipient after the interface 600 was displayed initially. In other implementations, the instant messages reflected in the message history box 605 may be saved when the interface 600 is dismissed, for example, such that the message history box 605 may be repopulated with those instant messages when the interface 600 is displayed again at a later time.

The instant messaging interface 600 also includes a message specification box 620 in which the sender may specify a message to be sent to the recipient. The sender may enter text to be sent to the recipient in the message specification box 620. The instant message interface 600 includes a set of format controls 625 that may be used to format the text entered in the message specification box 620. More particularly, the controls in the set of format controls 625 enable the user to change the size, foreground color, background color, style, and effects of the text entered in the message specification box 620. The set of format controls 625 also includes controls for inserting objects that are not plain text, such as hyperlinks and emoticons, into the message specification box 620.

After a message has been specified in the message specification box 620, the message may be sent by selecting a send button 625 included in a second control set 630. After the send button 635 has been selected, the text that has been entered in the message specification box 620 is sent to the recipient, and the message specification box 620 is cleared. The message is added to the message history box 605. The message also is displayed in a message history box 605 of an instance of the instant messaging interface 600 being viewed by the recipient. Also included in the second control set 630 are controls for warning instant message senders, blocking instant messages from particular senders, or adding the sender to a participant list used by the sender.

The recipient with the identifier "Buddy1" may be unavailable to send and receive instant messages at a time when the sender with the identifier "MyUser" sent the message 610. As a result, the recipient may have chosen a descriptive message to be sent automatically to other users, such as the sender, that send instant messages to the recipient. The message 615 may represent such a descriptive message, which is why the message 615 is identified as an "AutoResponse from Buddy1." The message 615 may be processed or simply presented to the sender with the instant messaging interface 600. The sender may continue to send instant messages to the recipient, if so desired.

Figure 7:
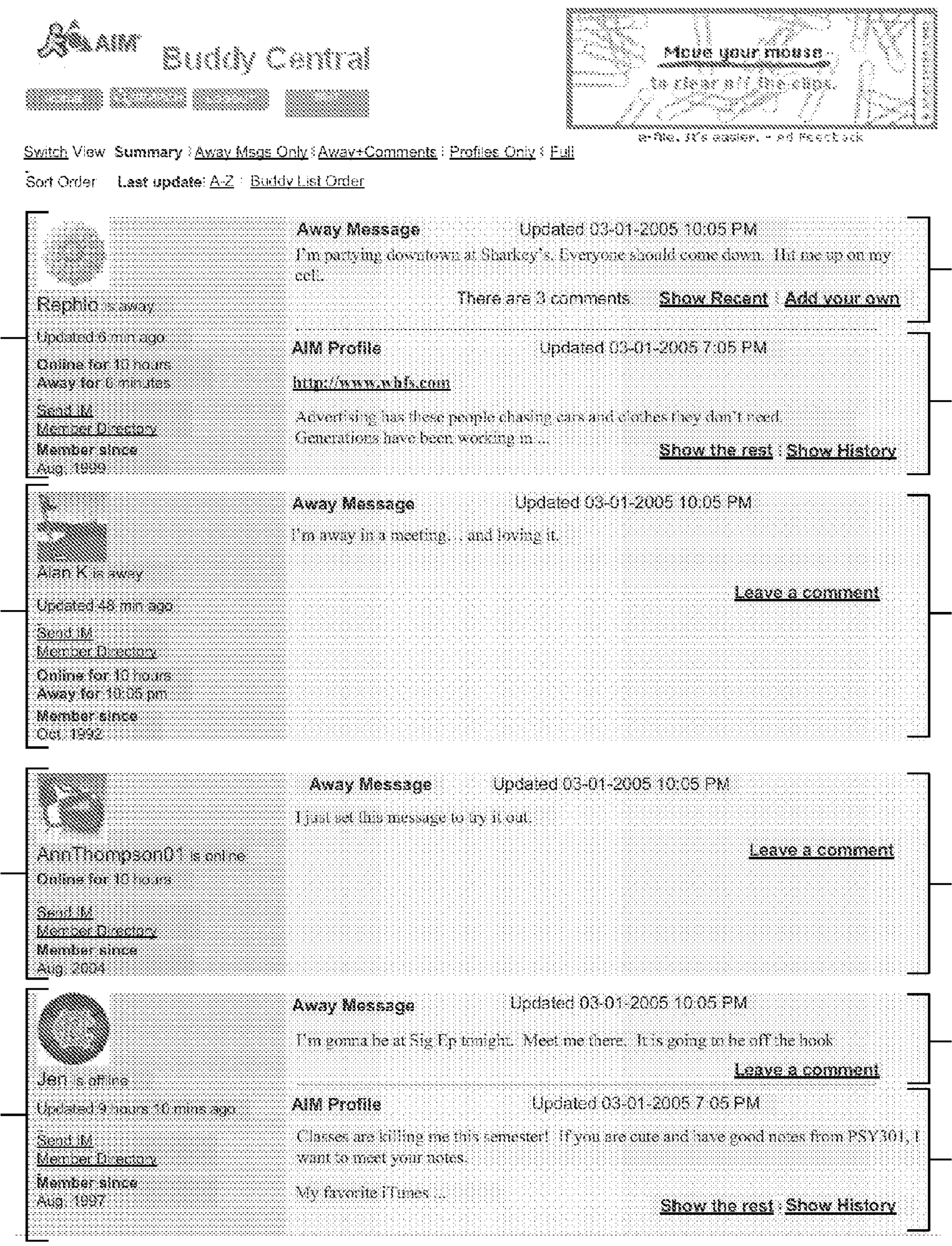
FIG. 7 is an interface for displaying electronic messages describing multiple users.

Referring to FIG. 7, an away message display interface 700 is similar to the away message display interfaces 500 of FIGS. 5A and 5B. However, instead of displaying information describing a single user, the away message display interface 700 displays information describing multiple users. The multiple users may be users included in a participant list of a user of the interface 700. In one implementation, the interface 700 is a web page that may be displayed in a web browser. In another implementation, the interface 700 may be configured for display on a device with limited display capabilities, such as a mobile device.

Identifiers 705*a*-705*d* for the users are displayed on the left side of the interface 700. Away messages 710*a*-710*d* describing the users are displayed next to the identifiers 705*a*-705*d*. A profile or a user may be displayed next to the identifier of the user in the interface 700, for example, when the profile is not included in the away message for the user, or when the user has not otherwise indicated that the profile is not to be displayed. For example, the interface 700 includes a profile 715*a* of the user corresponding to the identifier 705*a* and a profile 715*b* of the user corresponding to the identifier 705*d*. In the illustrated implementation, the profiles 715*a* and 715*b* are displayed next to the identifiers 705*a* and 705*d*.

In some implementations, a user of the interfaces 500, 600, and 700 may be enabled to submit comments on the away messages and profiles displayed in the interfaces 500, 600, and 700. The comments may be made available to other users that view the displayed away messages and profiles. For example, the comments may be included as part of the away messages and profiles, which will result in their automatic distribution to the other users.

Figure 8:
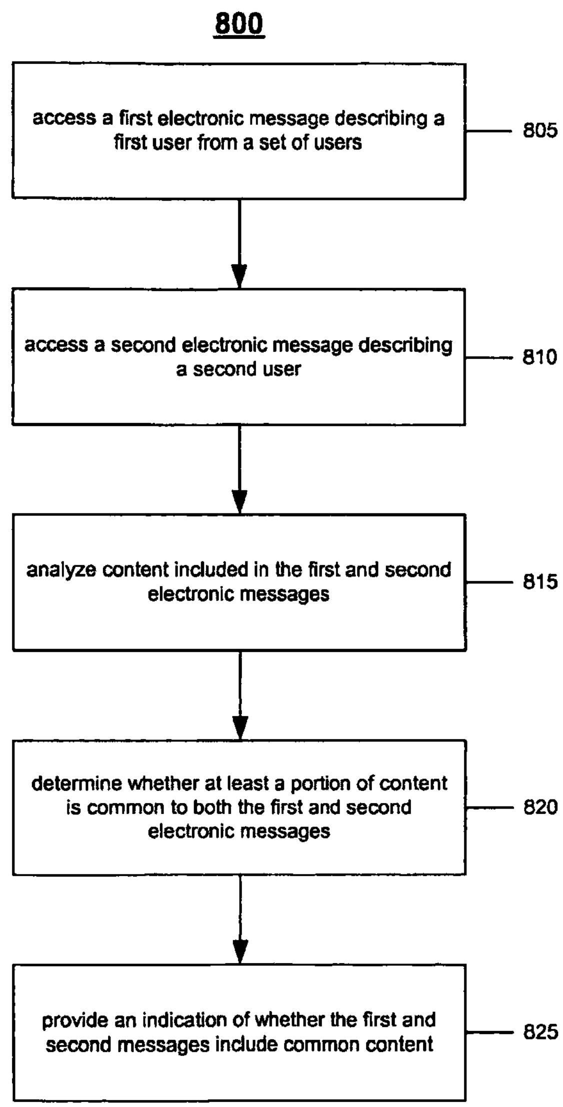
FIG. 8 is a flow chart of a process for identifying users with stored electronic messages that include common content.

Referring to FIG. 8, a process 800 is executed to identify users sharing common characteristics. The common characteristics may be indicated by electronic content associated with the identified user, such as electronic messages describing the identified users. The process 800 may be executed by a client device used by a user for whom an indication of the users sharing common characteristics is presented, such as one of the client devices 108*a* and 108*b* of FIG. 1. Alternatively or additionally, the process 800 may be executed by an IM server, such as the IM server 102 of FIG. 1. For example, the process 800 may be executed by an IM manager application of the IM server, such as the IM manager application 104 of FIG. 1. For ease of discussion, the process 800 will be described below as being performed by the client device.

The client device accesses a first electronic message describing a first user from a set of users (805). The client device also accesses a second electronic message describing a second user from the set of users (810). The first and second electronic messages may include current and previous away messages of the first and second users, profiles of the first and second users, comments on the away messages or the profiles, a blog of previous away messages of the first and second users, or indications of the locations of the first and second users. In addition, the electronic content may include other information related to the first and second users, such as information included in user information feeds for the first and second users, histories of messages exchanged with the first and second users, and other information of interest to the first and second users. If the first or second electronic message includes a hyperlink, information located at the hyperlink may be accessed and included as part of the electronic message. Consequently, the electronic messages may indicate events, activities, characteristics, and locations of the first and second users. The client device may access the first and second electronic messages from away message repositories corresponding to client systems used by the first and second users. For example, if the first user uses the client system 108*b* of FIG. 1, the client system may access the first electronic message from the away message repository 112*b* of FIG. 1. Alternatively or additionally, the client device may access copies of the first and second electronic messages that are maintained by an IM server, such as the IM server 102 of FIG. 1. The first and second users may have made different electronic messages available to different users. In such a case, the client device accesses the electronic messages that are accessible to the user for whom the process 800 is being executed.

In one implementation, the set of users may be a participant list used by the user for whom the process 800 is being executed. In such an implementation, the first user or the second user may be the user of the participant list rather than a user included in the participant list. In another implementation, the set of users may be a set of users that share a common characteristic, such as a set of users that attended a particular college or that work for a particular employer. Alternatively or additionally, the first and second users may be selected based on their use of an electronic messaging application, such as an instant messaging application. For example, the first and second users may be selected based on times since they were last available to send and receive electronic messages, times at which they last sent electronic messages, frequencies with which they send electronic messages, amounts of time for which they have been sending electronic messages, formats of the electronic messages that they send, content of electronic messages that they send, measurements of their popularity, or other indicators of a manner in which the first and second users exchange instant messages.

The first and second users may be selected manually by the user, or automatically by the client device, for example, while processing the entire set of users. The first user or the second user may be selected in response to a change in a corresponding electronic message. The first or second user may be selected in such a case to enable determination of whether the change in the first or second electronic message results in the first and second electronic messages having common content.

The client device analyzes content included in the first and second electronic messages (815). For example, the client device may extract text included in the electronic messages. If the accessed electronic messages include content that is not textual, then the client device may generate a textual description of the non-textual content. For example, if the accessed electronic messages include audio data, the client device may convert spoken words from the audio data to text. As another example, if the accessed electronic messages include video data or an image, the client device may generate a description of what is depicted in the video data or the image. In addition, the client device may access metadata associated with the electronic message or the components thereof. If the electronic messages are away messages, then the client device also may analyze the titles of the away messages. The client device may analyze the content included in the first and second electronic messages to identify events, activities, characteristics, and locations of the first and second users.

The client device determines whether at least a portion of content is common to both the first and second electronic messages (820). For example, the client device determines whether a portion of the text included in first electronic message matches a portion of the text included in the second electronic message. The client device may use standard search techniques when determining whether the first and second electronic messages include common content. Two portions of text may be said to match if the two portions exactly match, or if the two portions have similar meanings. For example, the portions "at the bar on Lake Street" and "going to the Lake Street Pub" may be said to match because the two portions have similar meanings. The client device also may determine that a portion of content is common to both the first and second electronic messages if the first and second electronic messages both include a particular portion of non-textual content, such as an image. The client device also may determine whether the first and second electronic messages indicate a common event that both the first and second users are attending, an activity in which the both the first and second users are participating, or a common characteristic shared by the first and second users. The client device also may determine whether the first and second electronic messages indicate a common location of both the first and second users, for example, because the first and second users are within a threshold distance from one another. In other implementations, other metrics may be used to determine whether the first and second electronic messages include common content.

The client device then provides an indication of whether the first and second messages include common content (825). In one implementation, the client device provides a visual indication of the common content. For example, if the set of users forms a participant list, the visual indication may be presented on a participant list interface in which the participant list is presented to the user, such as the interface 200 of FIG. 2. For example, the client device may add a group for identifiers of the first and second users to the participant list displayed in the participant list interface. The group may be added to the participant list only when a threshold number of identifiers (e.g., two identifiers) are to be added to the group. The client device also may highlight the identifiers of the first and second users within the participant list. The client device may display a graphical icon that is indicative of the common content next to the identifiers of the first and second users within the participant list. Alternatively, if the set of users does not form a participant list, the visual indication may be presented in a standalone interface. For example, an electronic message, such as an instant message, a text message, or an e-mail message, may be sent to the user for whom the process 800 is executed. In such a case, the standalone interface is an interface used to present the electronic message to the user.

In another implementation, the client device may provide an audible indication of the common content. For example, the client device may audibly read the identifiers of the first and second users or the common content to the user. The client device also may present a pre-recorded message to the user. Alternatively or additionally, the client device may leave a voicemail for the user in which the identifiers of the first and second users or the common content are read.

In addition, the client device may provide an indication of the first and second messages. For example, the client device may provide an indication of the common content of the first and second messages. In some implementations, the client device may provide an indication of the common content in response to a request for the common content from the user. In other implementations, the indications of the first and second users that are presented when the first and second users maintain the common content may be selected to reveal the first and second messages.

The described implementation of the process 800 identifies content shared between a set of two users. Other implementations of the process 800 may be used to identify content shared among user sets of other sizes. For example, another implementation of the process 800 may be used to identify whether a portion of content included in electronic messages associated with three users is common to all three electronic messages, and to provide an indication of the common content.

Furthermore, the process 800 may be executed multiple times for multiple different sets of users, or for multiple different subsets of the set of users. Indications of common content for each of the multiple different sets may be provided simultaneously. For example, in implementations where the set of users is a participant list, indications of common content may be provided on the participant list interface as different groups, icons, or colors of highlighting.

The process 800 may be executed automatically or in response to a user request. For example, the process 800 may be executed periodically on a recurring basis. Each time that the process 800 is executed, the user may be asked to confirm whether an indication of users that maintain common content should be presented. Furthermore, a user may be enabled to indicate that the process 800 should not be executed automatically or without a user request.

Each execution of the process 800 may update an indication of users that maintain common content that was provided in response to a previous execution of the process 800. For example, an execution of the process 800 may result in users being added to or removed from a group in the participant list that was created in response to a previous execution of the process 800. If a group becomes empty, then the group may be removed from the participant list automatically. More generally, indications of users that maintain common content may be presented until the user indicates that they no longer should be presented, for a predetermined amount of time, or while other criteria for presentation remain satisfied.

Figure 9A:
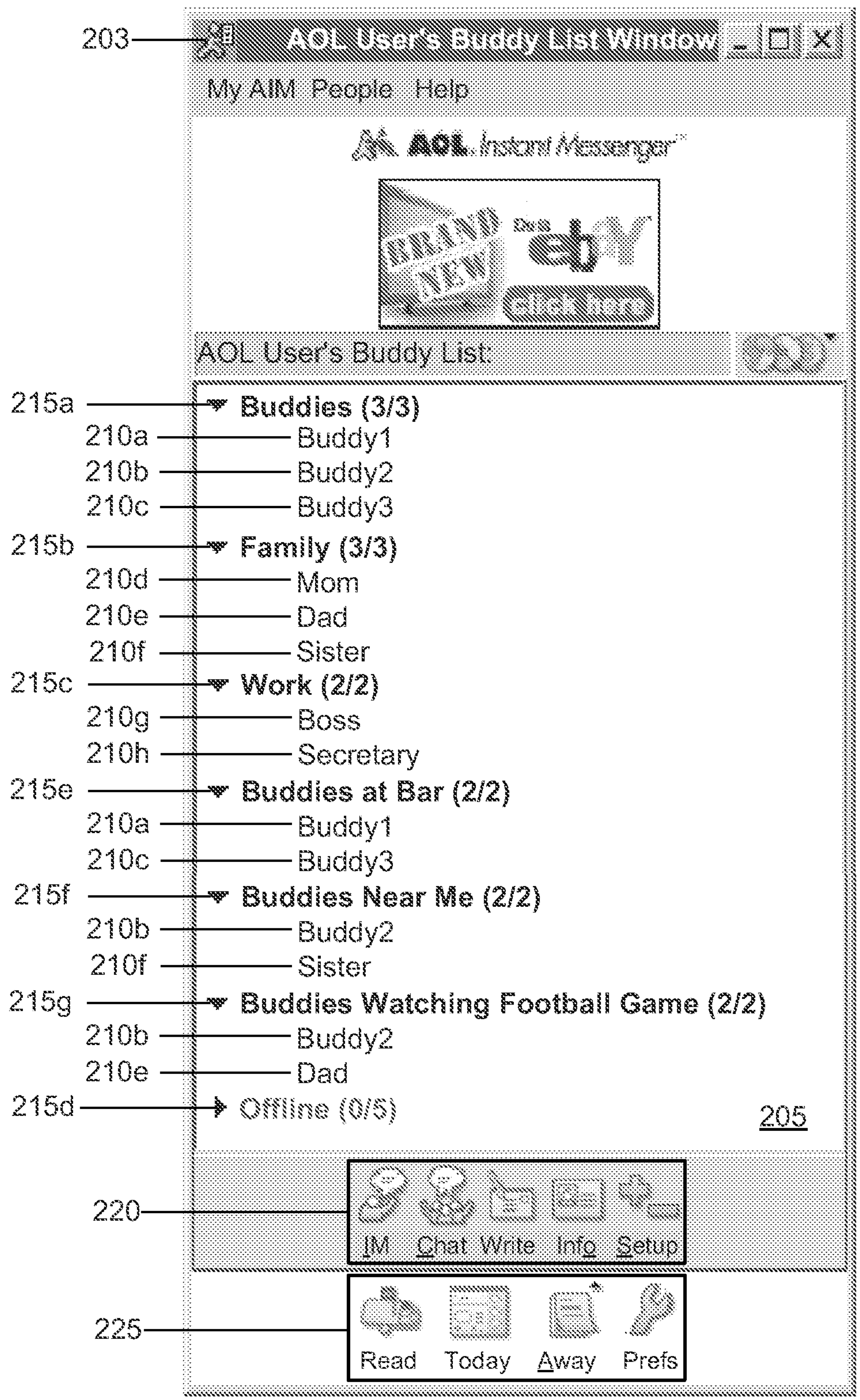
FIGS. 9A-9C are illustrations of the interface of FIG. 2 including indications of characteristics shared among the users for which identifiers are included in the interface.
Figure 9B:
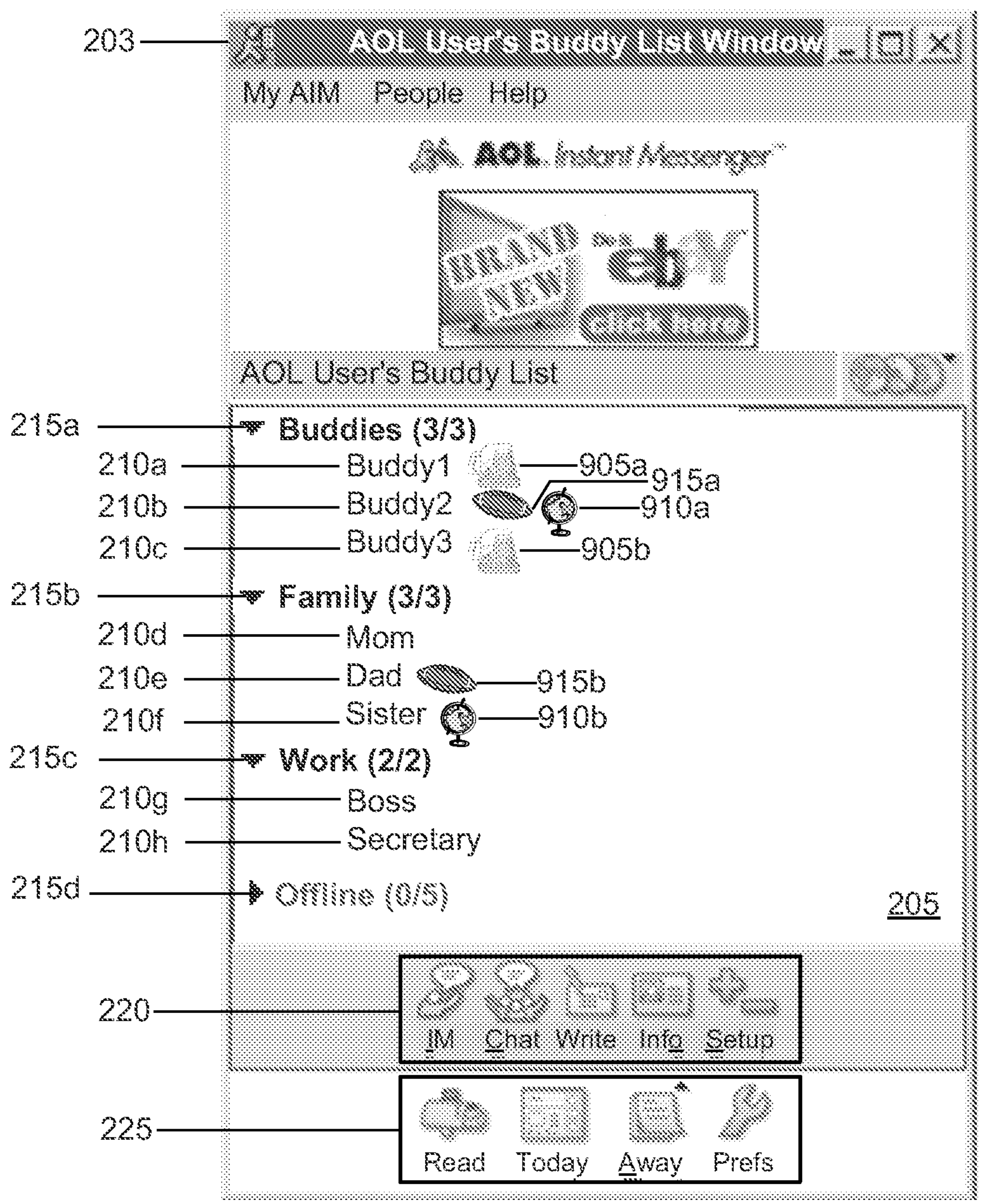
Figure 9C:
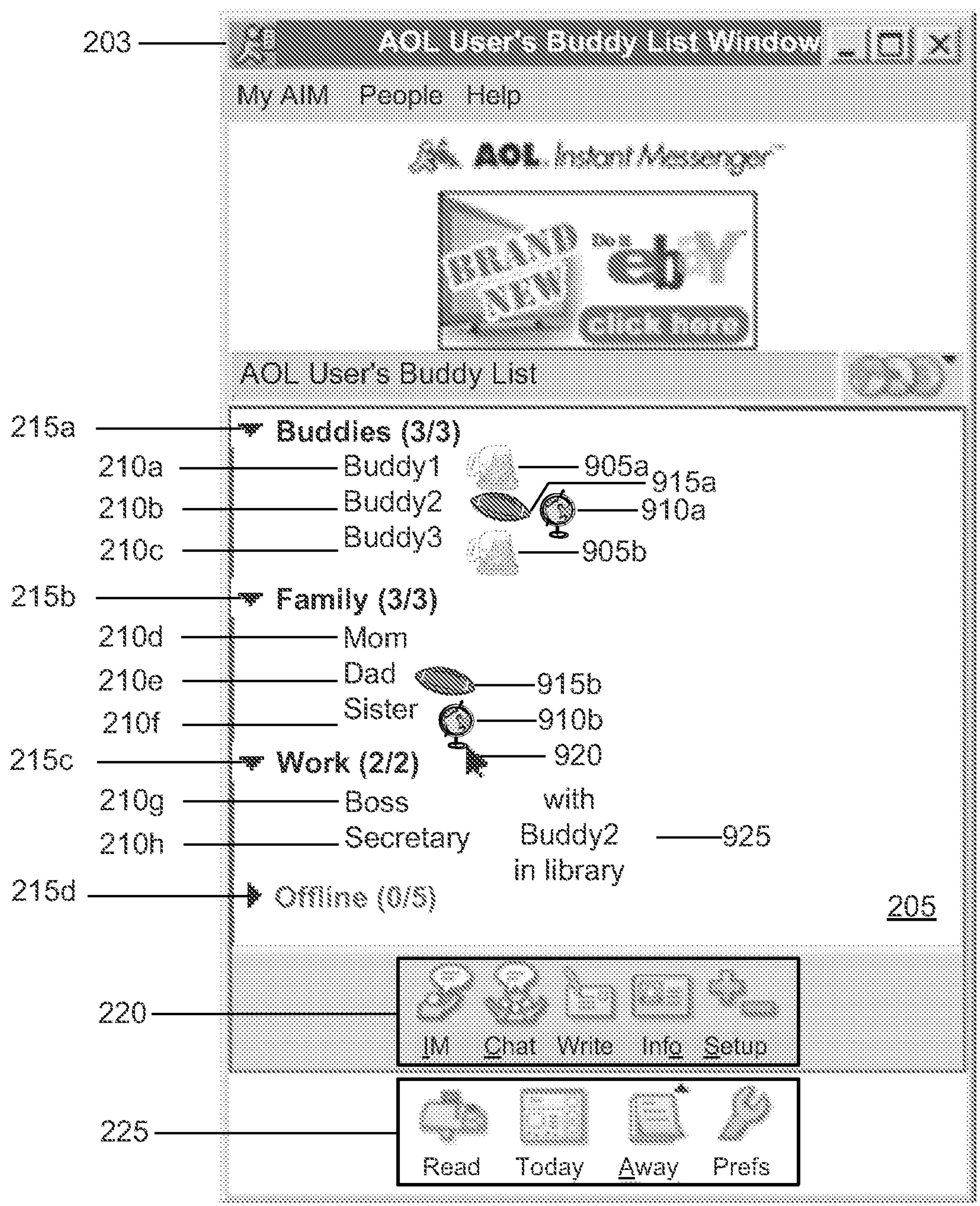

Referring to FIGS. 9A-9C, the participant list interface 200 of FIG. 2 may be augmented with additional information after the process 800 of FIG. 8 is executed to identify content that is common to electronic messages associated with multiple users included in the displayed participant list 205. Before the interfaces 200 illustrated in FIGS. 9A and 9C are presented, the process 800 has been executed multiple times. One execution of the process 800 determined that a first of set users corresponding to the identifiers 210*a* and 210*c* are located at the same bar. Another execution determined that a second set of users corresponding to the identifiers 210*b* and 210*f* are located near a user of the interface 200, and another execution determined that a third set of users corresponding to the identifiers 210*b* and 210*e* are watching a football game. Consequently, the participant list interface 200 is augmented to visually indicate that, for each of the three sets of users identified by the repeated executions of the process 800, a portion of content is common to electronic messages associated with the users included in the set.

For example, in the implementation illustrated in FIG. 9A, an additional group has been created in the participant list 205 for each of the three sets of users. For example, a group 215*e* has been created for the identifiers 210*a* and 210*c*, a group 215*f* has been created for the identifiers 210*b* and 210*f*, and a group 215*g* has been created for the identifiers 210*b* and 210*e*. Consequently, the identifiers 210*a*, 210*b*, 210*c*, 210*e* and 210*f* are associated with multiple groups within the participant list 205.

In the implementation illustrated in FIG. 9B, icons that are representative of each of the three sets of users are displayed next to the identifiers of the users included in the first set. For example, the icons 905*a* and 905*b* are displayed next to the identifiers 210*a* and 210*c*, respectively, to indicate that the users corresponding to the identifiers 210*a* and 210*c* are included in the set of users located at the bar. Similarly, the icons 910*a* and 910*b* are displayed next to the identifiers 210*b* and 210*f*, respectively, to indicate that the users corresponding to the identifiers 210*b* and 210*f* are included in the set of users located near the user of the participant list interface 200. In addition, the icons 915*a* and 915*b* are displayed next to the identifiers 210*b* and 210*e*, respectively, to indicate that the users corresponding to the identifiers 210*b* and 210*e* are included in the set of users that are watching a football game.

Referring to FIG. 9C, each of the icons 905*a*, 905*b*, 910*a*, 910*b*, 915*a*, and 915*b* may be selectable from the interface 200 to reveal information describing the corresponding set of users and the common content shared among the users included in the set. For example, a pointing device 920 may be used to select the icon 910*b* that is associated with the identifier 210*f*. In response, a tool tip 925 is displayed to indicate that the user corresponding to the identifier 210*f* is in a library with the user corresponding to the identifier 210*b*. The icon 910*b* corresponds to the second set of users that are located near the user of the participant list interface 200. The tooltip 925 may indicate that the user corresponding to the identifier 210*f* is in the library because the user of the participant list interface 200 has indicated that he is in the library, or because an electronic message associated with the user indicates the he is in the library.

In the implementations illustrated in FIGS. 9A-9C, the identifiers 210*a*-210*h* have not been moved from their original positions within the participant list 205, which may enable the user of the interface 200 to easily identify the identifiers 210*a*-210*c* from within the participant list 205. In other implementations, the identifiers 210*a*-210*h* may be moved from their original positions within the participant list 205 when augmenting the participant list 205 with additional information identifying the three sets of users. The user of the interface 200 may be presented with a notification that the additional information is being added to the interface 200. The user may be enabled to accept the additional information such that the three sets of users are visually identified in the participant list interface 200. Alternatively, the user may dismiss the additional information, in which case the participant list interface 200 is not changed. The user also may be enabled to accept some of the additional information, such as information identifying one or two of the three sets, and to dismiss the rest of the additional information.

Figure 9D:
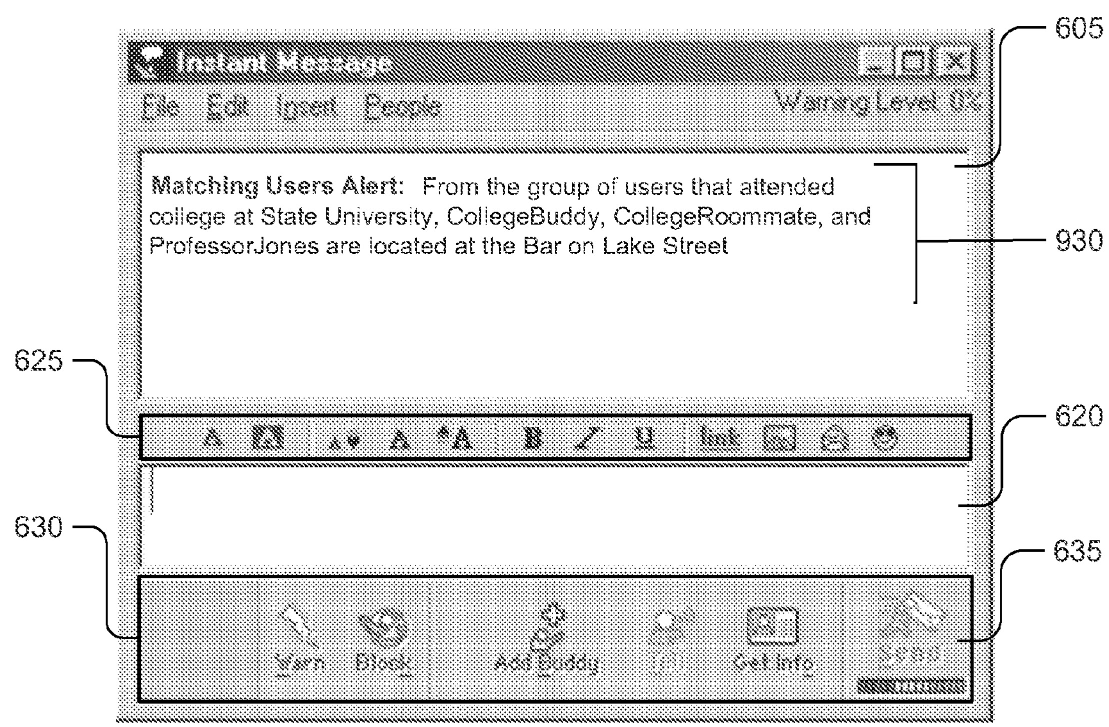
FIG. 9D is an illustration of an interface identifying multiple users from a set of users with stored electronic messages that include common content.

Referring to FIG. 9D, the instant messaging interface 600 of FIG. 6 may be used to identify multiple users from a set of users with stored electronic messages that include common content. The instant messaging interface 600 may be presented after execution of the process 800 has completed. More particularly, the process 800 may have been executed to identify users from a set of users that attended a particular college with stored electronic messages that include common content. Results of the execution of the process 800 have been sent to a user for whom the process 800 was executed as an instant message, and the interface 600 may have been presented to the user in response to those results. The message history box 605 of the interface 600 includes a message 930 that indicates that three users from the set of users (e.g., users named “CollegeBuddy,” “CollegeRoommate,” and “ProfessorJones”) have common content within their electronic messages. Furthermore, the message 930 indicates that the common content indicates that the three identified users are at the bar on Lake Street.

Figure 10:
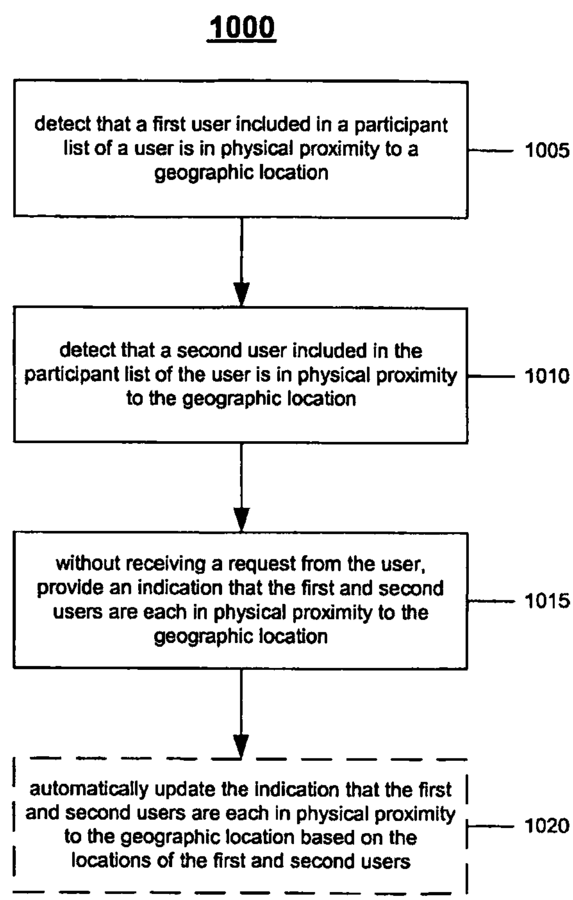
FIG. 10 is a flow chart of a process for identifying users that are located at a common geographic location.

Referring to FIG. 10, a process 1000 is executed to identify users located at a common location. The common location may be indicated by electronic content associated with the identified user, such as electronic messages describing the identified users. The process 1000 may be executed by a client device used by an IM server, such as the IM server 102 of FIG. 1. For example, the process 800 may be executed by an IM manger application of the IM server, such as the IM manager application 104 of FIG. 1. Alternatively or additionally, the process 1000 may be executed by a client device of a user for whom the co-located users are identified, such as one of the client devices 108*a* and 108*b* of FIG. 1. For ease of discussion, the process 1000 will be described below as being performed by the IM server.

The IM server detects that a first user included in a participant list of a user is in physical proximity to a geographic location (1005). The IM server also detects that a second user included in the participant list of the user is in physical proximity to the geographic location (1010). The geographic location may be a building, a street, an intersection, a business, a residence, or another location. The first and second users both may be in physical proximity to the geographic location if the first and second users are both within a threshold distance of the geographic location or of one another. The IM server may detect the geographic locations of the first and second users as the geographic locations of mobile devices used by the first and second users. The mobile devices may include Global Positioning System (GPS) receivers that may be used to detect the geographic locations of the mobile devices. Alternatively or additionally, the mobile devices may determine their geographic locations through triangulation based on distances to at least three systems with which the mobile devices communicate, such as cellular telephone towers.

In one implementation, the mobile devices may provide the geographic locations to the IM server directly. In another implementation, the mobile devices may include indications of the geographic locations in electronic messages including information describing the first and second users, and the IM server may access the geographic location from the electronic messages. In some implementations, the first and second users may be enabled to modify or augment the automatically identified geographic locations, for example, with a name.

Alternatively or additionally, the first and second users may manually specify the geographic locations. For example, the first and second users may include indications of the geographic locations in the electronic messages, and the IM server may access the electronic messages to detect the geographic locations. The IM server may access the electronic messages from away message repositories corresponding to client systems used by the first and second users. For example, if the first user uses the client system 108*b* of FIG. 1, the IM server may access the electronic message of the first user from the away message repository 112*b* of FIG. 1. Alternatively or additionally, the IM server may access local copies of the electronic messages.

The first and second users may be selected manually by the user of the participant list. Alternatively or additionally, the first and second users may be selected automatically by the client device, for example, while processing the entire participant list. In one implementation, the first user or the second user is the user of the participant list rather than a user included in the participant list. The first and second users may or may not be available to send and receive electronic messages. The first user or the second user may be selected in response to a change in a corresponding electronic message. In such a case, the first or second user may be selected to enable determination of whether the change in the first or second electronic message results in the first and second electronic messages having common content.

Without first receiving a request from the user of the participant list, the IM server provides an indication that the first and second users are each in physical proximity to the geographic location (1015). In one implementation, the client device provides a visual indication of the common location on a participant list interface in which the participant list is presented to the user, such as the interface 200 of FIG. 2. For example, the client device may add a group for identifiers of the first and second users to the participant list displayed in the participant list interface. The client device also may highlight the identifiers of the first and second users within the participant list. The client device may display a graphical icon that is indicative of the common content next to the identifiers of the first and second users within the participant list. In another implementation, the client device may provide an audible indication of the common content. For example, the client device may audibly read the identifiers of the first and second users or the common content to the user of the participant list.

The IM server may continue to detect the geographic locations of the first and second users, as described above. The IM server may automatically update the indication that the first and second users are each in physical proximity to the geographic location based on the locations of the first and second users (1020). For example, the IM server may detect that one or both of the first and second users has moved away from the geographic location. In such a case, the IM server may remove or stop providing the indication that the first and second users are each in physical proximity to the geographic location.

The described implementation of the process 1000 identifies a location shared among a set of two users. Other implementations of the process 1000 may be used to identify a location shared among sets of users of other sizes. For example, another implementation of the process 1000 may be used to identify whether three users are in a common location, and to provide an indication of the common location.

Furthermore, the process 1000 may be executed multiple times for multiple different sets of users included in the participant list. Indications of a common location for each of the multiple different sets may be provided simultaneously. For example, indications of each of the common locations may be provided on the participant list interface as different groups, icons, or colors of highlighting.

Figure 11:
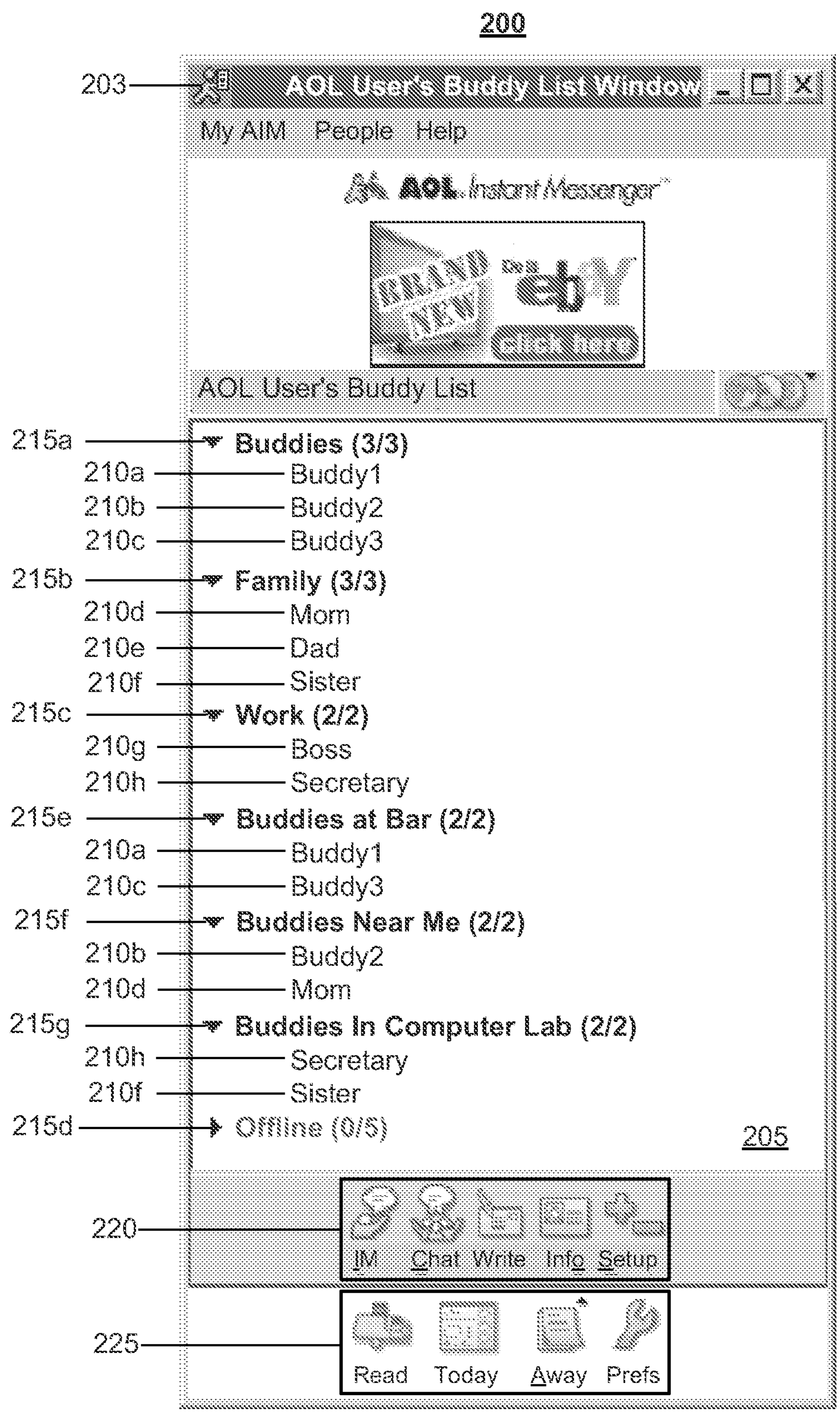
FIG. 11 is an illustration of the interface of FIG. 2 including indications of locations shared among the users for which identifiers are included in the interface.

Referring to FIG. 11, the participant list interface 200 of FIG. 2 may be augmented with additional information after the process 1000 of FIG. 10 is executed to identify multiple users included in the displayed participant list 205 that are at a common location. Before the interface 200 illustrated in FIG. 11 is presented, the process 1000 has been executed multiple times. One execution of the process 1000 determined that a first set of users corresponding to the identifiers 210*a* and 210*c* are located at the same bar. Another execution determined that a second set of users corresponding to the identifiers 210*b* and 210*d* are located near a user of the interface 200, and another execution determined that a third set of users corresponding to the identifiers 210*h* and 210*f* are located in a computer lab. Consequently, the participant list interface 200 is augmented to visually indicate that, for each of the three sets of users identified by the repeated executions of the process 1000, a portion of content is common to electronic messages associated with the users included in the set.

An additional group has been created in the participant list 205 for each of the three sets of users. For example, a group 215*e* has been created for the identifiers 210*a* and 210*c*, a group 215*f* has been created for the identifiers 210*b* and 210*f*, and a group 215*g* has been created for the identifiers 210*b* and 210*e*. Consequently, the identifiers 210*a*, 210*b*, 210*c*, 210*d*, 210*f* and 210*h* are associated with multiple groups within the participant list 205. Similarly, highlighting or icons may be used to visually identify the users included in each of the three sets. The highlighted identifiers or the icons may be selected to reveal information describing the three sets, for example, within a tooltip or a pop-up window.

Figure 12:
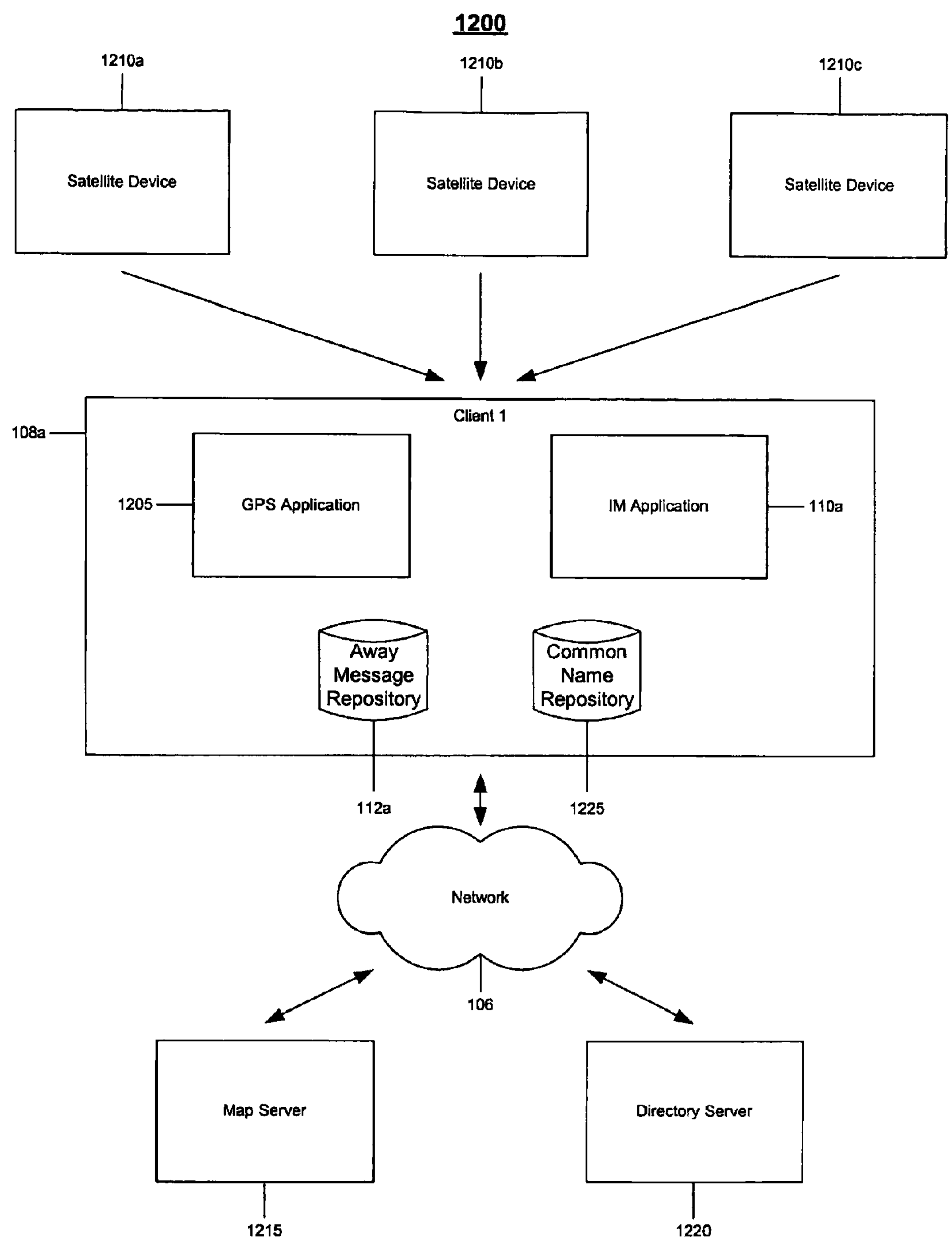
FIG. 12 is a block diagram of a system for identifying a location of a mobile computing device.

Referring to FIG. 12, a system 1200 is used to identify a geographic location of a client system 108*a* for use with an IM application 110*a*. A GPS application 1205 of the client system 108*a* communicates with satellite devices 1210*a*-1210*c* to identify a location of the mobile device. The client system 108*a* also may communicate with a map server 1215 and a directory server 1220 through a network 106. The client system 108*a* also includes an away message repository 112*a* and a common name repository 1225. The network 106, the client system 108*a*, the IM application 110*a*, and the away message repository 112*a* are similar to corresponding components from FIG. 1.

The GPS application 1205 is configured to determine a location of the client system 108*a*. The GPS application 1205 may include a GPS receiver and a location determination module. The GPS receiver is configured to communicate with the satellite devices 1210*a*-1210*c*. Based on the signals received from the satellite devices 1210*a*-1210*c*, the location determination module calculates a distance to each of the satellite devices 1210*a*-1210*c*. The location determination module then may determine the location of the client system 108*a* based on the calculated distances to the satellite devices 1210*a*-1210*c*. The GPS application 1205 may determine the location of the client system 108*a* as latitude and longitude coordinates, which are also known as GPS coordinates.

The map server 1215 provides addresses or other representations of locations identified by the GPS application 1205. For example, the GPS application 1205 may provide the map server 1215 with the latitude and longitude coordinates identifying the location of the client system 108*a*. In response, the map server may identify an address, a name, or another representation of the location of the client system 108*a*. In some implementations, the functionality provided by the map server 1215 may be included in the GPS application 1205.

The directory server 1220 also provides information about the location of the client system 108*a*. More particularly, given GPS coordinates or an address from the GPS application 1205 or the map server 1215, the directory server 1220 may provide a name of the location. For example, if the client system 108*a* is located at a business, the directory server 1220 may provide a name of the business in response to the address. As another example, if the client system 108*a* is located at a residence, the directory server 1220 may provide the name of a person that lives at the residence. In some implementations, the directory server also may be configured to provide additional information describing the location, such as a phone number of the location. In some implementations, the functionality provided by the directory server 1220 may be included in the GPS application 1205.

The common name repository 1225 stores alternative representations of the locations of the client system 108*a* that were identified by the GPS application 1205. For example, the common name repository 1225 may store names and other information describing the locations that were provided by the map server 1215 or the directory server 1220, or by a user of the client system 108*a*. The stored names and descriptive information for the previous locations may be used when the client system 108*a* is subsequently located at one of the previous locations without having to identify the name or descriptive information again.

Figure 13:
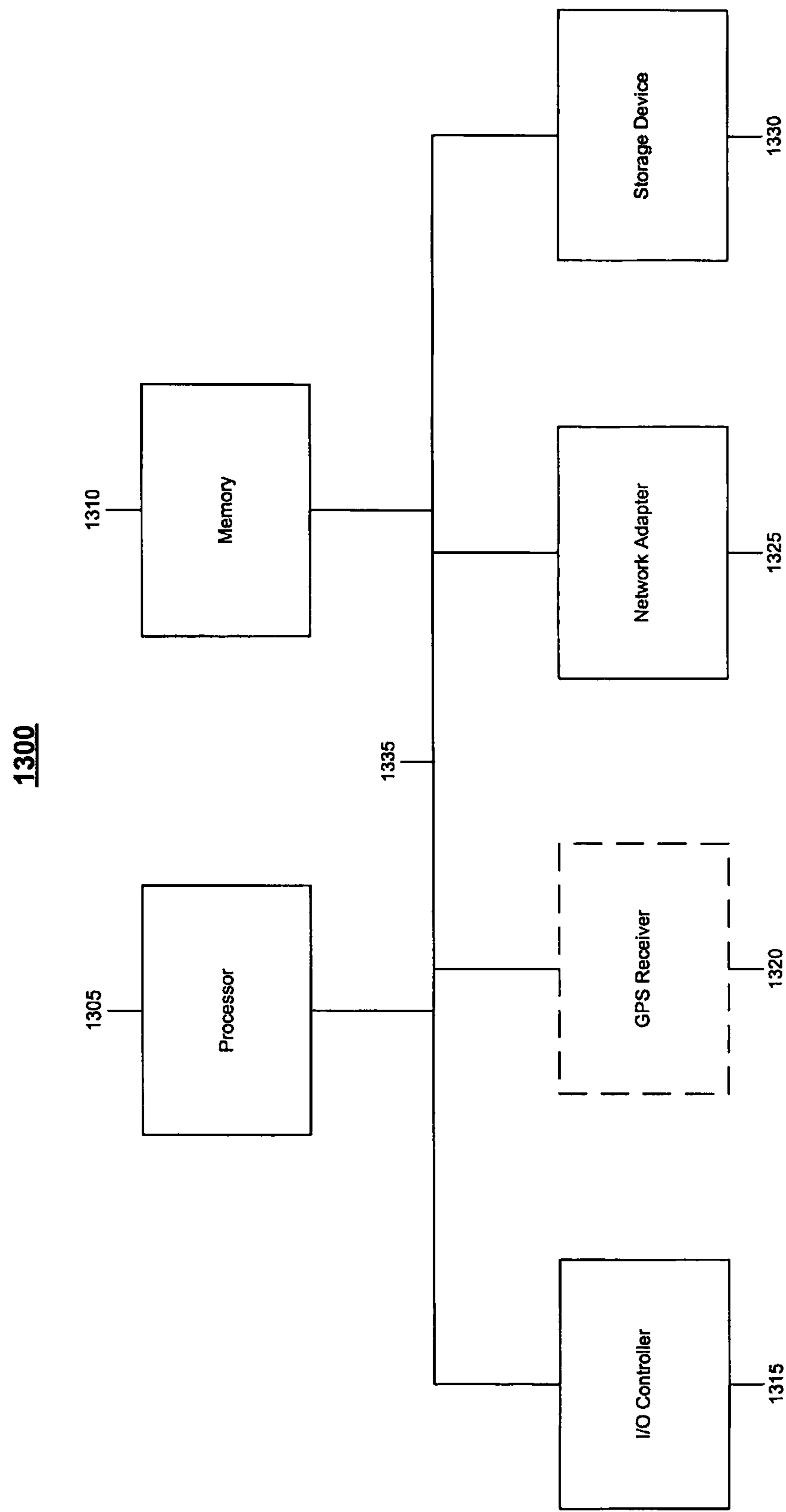
FIG. 13 is a block diagram of a computing device that may be included within the client and server systems shown in FIG. 1, according to one implementation.

FIG. 13 is a block diagram of a computing device 1300 that may be included within the IM server 102 and/or the client devices 108*a* and 108*b*. The computing device 1300 may represent a general-purpose computer, a special-purpose computer, or a mobile computing device, such as a portable computer, a mobile telephone, or a PDA. The computing device 1300 includes a processor 1305, a memory 1310, an input/output controller 1315, a GPS receiver 1320, a network adapter 1325, and a storage device 1330. Each of the components 1305, 1310, 1315, 1320, 1325 and 1330 are interconnected using a system bus 1335.

The processor 1305 is capable of processing instructions for execution within the computing device 1300. In one implementation, the processor 1305 is a single-threaded processor. In another implementation, the processor 1305 is a multi-threaded processor. The processor 1305 is capable of processing instructions stored in the memory 1310 or on the storage device 1325 to display graphical information for a GUI on an external input/output device that is coupled to the input/output controller 1315.

The memory 1310 stores information within the computing device 1300. In one implementation, the memory 1310 is a computer-readable medium. In one implementation, the memory 1310 is a volatile memory unit. In another implementation, the memory 1310 is a non-volatile memory unit.

The input/output controller 1315 manages input/output operations for the computing device 1300. In one implementation, the input/output controller 1315 is coupled to an external input/output device, such as a keyboard, a pointing device, or a display unit that is capable of displaying various GUIs, such as the GUIs shown in the previous figures, to a user.

The GPS receiver 1320 is similar to the GPS application 1205 of FIG. 12. The GPS receiver 1320 is configured to receive signals from multiple GPS satellites, such as the satellite devices 1210*a*-1210*c* of FIG. 12, and to use the received signals to calculate a location of the computing device 1300, for example, as GPS coordinates.

The computing device 1300 uses the network adapter 1325 to communicate with other network devices. If, for example, the client device 108*a* is a mobile device that includes the computing device 1300, the computing device 1300 uses its network adapter 1325 to communicate with the host server 106 over a wireless connection.

The storage device 1330 is capable of providing mass storage for the computing device 1300. In one implementation, the storage device 1330 is a computer-readable medium. In various different implementations, the storage device 1330 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer- or machine-readable medium, such as the memory 1310, the storage device 1330, or a propagated signal.

A number of implementations have been described. Nevertheless, it will be understood that various modifications may be made. Accordingly, other implementations are within the scope of the following claims.

What is claimed is:

1. A system comprising:

at least one processor; and at least one non-transitory computer readable storage medium storing instructions thereon that, when executed by the at least one processor, cause the system to:

determine a location of a first user of a communications system based on GPS location information of a mobile device associated with the first user;

analyze content in an electronic message posted to the communications system for viewing by co-users associated with a user within the communications system to determine a second location of a second user, the content in the electronic message being composed by the user of the communications system, the second location of the second user being one of an address, a building, a business, a street, an intersection, or a residence;

determine that the GPS location information associated with the first user is within a threshold proximity of the second location associated with the second user; and provide an indication that the first and second users are near each other.

2. The system as recited in claim 1, wherein the instructions, when executed by the at least one processor, further cause the system to provide the indication that the first and second users are near each other by sending a message to one or more of the mobile device associated with the first user or a second mobile device associated with the second user.

3. The system as recited in claim 2, wherein the instructions, when executed by the at least one processor, further cause the system to provide the indication that the first and second users are near each other by posting a message to one or more of a first information feed associated with the first user or a second information feed associated with the second user.

4. The system as recited in claim 3, wherein:

the electronic message is in the first information feed; and the server is configured to access the first information feed to analyze the electronic message.

5. The system as recited in claim 2, wherein the instructions, when executed by the at least one processor, further cause the system to provide the indication that the first and second users are near each other by displaying an icon in a graphical user interface accessible by one or more of the first user or the second user.

6. The system as recited in claim 1, wherein the instructions, when executed by the at least one processor, further cause the system to determine the location of the second user based on a disclosure in the electronic message of an event the second user is attending.

7. The system as recited in claim 1, wherein the instructions, when executed by the at least one processor, further cause the system to determine the location of the second user based on a prior electronic message from the second user indicating an intent of the second user to be at a future location.

8. A method comprising:

determining, using a processor, a location of a mobile device associated with a first user of the communications system;

receiving and analyzing information in an electronic message posted to the communications system for viewing by co-users associated with a user within the communications system to determine a second location of a second user of the communications system, the information in the electronic message being composed by the user of the communications system, the second location of the second user being one of an address, a building, a business, a street, an intersection, or a residence;

determining that the first location associated with the mobile device of the first user is within a threshold proximity of the second location associated with the second user; and providing an indication that the first and second users are near each other.

9. The method as recited in claim 8, further comprising determining the location of the mobile device using GPS information regarding the mobile device.

10. The method as recited in claim 8, wherein the information composed by the user indicates an activity or an event in which the second user is participating.

11. The method as recited in claim 8, further comprising:

determining that the second location of the second user is within a threshold distance of the location of the mobile device associated with the first user.

12. The method as recited in claim 8, wherein providing the indication that the first and second users are near each other comprises displaying an icon on a graphical user interface displayed on the mobile device.

13. The method as recited in claim 12, wherein:

the graphical user interface includes a list of co-users of the communications system associated with the first user; and the icon is displayed next to a name associated with the second user in the list.

14. The method as recited in claim 8, wherein providing the indication that the first and second users are near each other comprises rearranging a position of a name associated with the second user in a list of co-users of the communications system associated with the first user.

15. The method as recited in claim 8, wherein providing the indication that the first and second users are near each other comprises displaying an electronic message on the mobile device.

16. The method as recited in claim 8, further comprising:

determining that the first and second users are participating in a common activity; and providing another indication that the first and second users are participating in the common activity.

17. The method as recited in claim 8, further comprising:

determining that the first and second users are attending a common event; and providing another indication that the first and second users are attending the common event.

18. A non-transitory computer-readable storage medium including a set of instructions that, when executed by at least one processor, cause a computer system to perform steps comprising:

determining a location of a mobile device associated with a first user of a communications system;

receiving and analyzing information in an electronic message posted to the communications system for viewing by co-users associated with a user within the communications system to determine a second location of a second user of the communications system, the information in the electronic message being composed by the user of the communications system, the second location of the second user being one of an address, a building, a business, a street, an intersection, or a residence;

determining that the location associated with the mobile device of the first user is within a threshold proximity of the second location associated with the second user; and providing an indication that the first and second users are near each other.

19. The computer-readable storage medium as recited in claim 18, further comprising instructions that, when executed by the at least one processor, cause the computer system to provide the indication that the first and second users are near each other by displaying an icon on a graphical user interface displayed on the mobile device.

20. The computer-readable storage medium as recited in claim 19, wherein:

the graphical user interface includes a list of co-users of the communications system associated with the first user; and the icon is displayed next to a name associated with the second user in the list.

21. The computer-readable storage medium as recited in claim 20, further comprising instructions that, when executed by the at least one processor, cause the computer system to rearrange a position of the name associated with the second user in the list of co-users based on the determination that the first and second users are near each other.

22. The computer-readable storage medium as recited in claim 20, further comprising instructions that, when executed by the at least one processor, cause the computer system to enable the user to communicate with the co-users on the list via the communication system.

23. The computer-readable storage medium as recited in claim 18, further comprising instructions that, when executed by the at least one processor, cause the computer system to determine the location of the mobile device using GPS information.

24. The computer-readable storage medium as recited in claim 23, further comprising instructions that, when executed by the at least one processor, cause the computer system to provide the indication that the first and second users are near each other by displaying an electronic message on the mobile device.

25. The computer-readable storage medium as recited in claim 24, further comprising instructions that, when executed by the at least one processor, cause the computer system to:

determine that the location of the second user is within a threshold distance of the location of the mobile device associated with the first user.

26. The computer-readable storage medium as recited in claim 18, wherein the received information regarding the second user comprises an electronic message indicating an activity or an event in which the second user is participating.

27. A mobile device comprising:

a display;

at least one processor; and at least one non-transitory computer readable storage medium storing instructions thereon that, when executed by the at least one processor, cause the mobile device to perform steps comprising:

determining a location of the mobile device, wherein the mobile device is associated with a first user of a communications system;

receiving and analyzing information in an electronic message posted to the communications system for viewing by co-users associated with a user within the communications system to determine a second location of a second user of the communications system, the information in the electronic message being composed by the user of the communications system, the second location of the second user being one of an address, a building, a business, a street, an intersection, or a residence;

determining that the location associated with the mobile device of the first user is within a threshold proximity of the second location associated with the second user; and providing an indication that the first and second users are near each other.

28. The mobile device as recited in claim 27, further comprising instructions that when executed by the at least one processor, further cause the mobile device to provide the indication that the first and second users are near each other by displaying an icon on a graphical user interface displayed on the mobile device.

29. The mobile device as recited in claim 27, wherein:

the graphical user interface includes a list of co-users of the communications system associated with the first user; and the icon is displayed next to a name associated with the second user in the list.

30. The mobile device as recited in claim 29, further comprising instructions that when executed by the at least one processor, further cause the mobile device to rearrange a position of the name associated with the second user in the list of co-users based on the determination that the first and second users are near each other.

31. The mobile device as recited in claim 30, wherein the instructions when executed by the at least one processor, cause the mobile device to provide the indication that the first and second users are near each other by displaying an electronic message on the mobile device.

32. The mobile device as recited in claim 29, further comprising instructions that when executed by the at least one processor, further cause the mobile device to enable the user to communicate with the co-users on the list via the communication system.

33. The mobile device as recited in claim 27, further comprising instructions that when executed by the at least one processor, further cause the mobile device to determine the location of the mobile device using GPS information.

34. The mobile device as recited in claim 33, further comprising instructions that when executed by the at least one processor, further cause the mobile device to:

determine that the location of the second user is within a threshold distance of the location of the mobile device associated with the first user.

35. The mobile device as recited in claim 27, wherein the received information regarding the second user comprises an electronic message indicating an activity or an event in which the second user is participating.

36. The mobile device as recited in claim 27, further comprising instructions that when executed by the at least one processor, further cause the mobile device to:

determine that the first and second users are participating in a common activity; and provide another indication that the first and second users are participating in the common activity.

37. The mobile device as recited in claim 27, further comprising instructions that when executed by the at least one processor, further cause the mobile device to:

determine that the first and second users are attending a common event; and provide another indication that the first and second users are attending the common event.

38. The system as recited in claim 1, wherein analyzing the electronic message associated with the second user to determine the second location of the second user comprises detecting a name of the second location of the second user.

39. The system as recited in claim 38, further comprising instructions that cause the system to verify that the GPS location information associated with the first user is in physically proximate to the location associated with the detected name.

* * * * *